United States Patent
Cho et al.

(10) Patent No.: US 11,194,711 B2
(45) Date of Patent: Dec. 7, 2021

(54) STORAGE DEVICE

(71) Applicant: SAMSUNG ELECTRONICS CO., LTD., Suwon-si (KR)

(72) Inventors: Hyunsoo Cho, Bucheon-Si (KR); Dong-Min Kim, Hwaseong-Si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/939,913

(22) Filed: Jul. 27, 2020

(65) Prior Publication Data

US 2021/0034514 A1 Feb. 4, 2021

(30) Foreign Application Priority Data

Aug. 2, 2019 (KR) .................. 10-2019-0094250

(51) Int. Cl.
| | |
|---|---|
| *G06F 12/00* | (2006.01) |
| *G06F 12/02* | (2006.01) |
| *G06F 9/30* | (2018.01) |
| *G06F 12/0871* | (2016.01) |
| *G06F 12/0873* | (2016.01) |
| *G06F 12/0893* | (2016.01) |
| *G06F 13/16* | (2006.01) |

(52) U.S. Cl.
CPC ...... *G06F 12/0246* (2013.01); *G06F 9/30047* (2013.01); *G06F 9/30189* (2013.01); *G06F 12/0871* (2013.01); *G06F 12/0873* (2013.01); *G06F 12/0893* (2013.01); *G06F 13/1668* (2013.01)

(58) Field of Classification Search
CPC ............ G06F 12/0246; G06F 9/30047; G06F 9/30189; G06F 12/0871; G06F 12/0873; G06F 12/0893; G06F 13/1668
See application file for complete search history.

(56) References Cited

U.S. PATENT DOCUMENTS

| | | |
|---|---|---|
| 7,350,044 B2 | 3/2008 | Keays |
| 8,555,106 B2 | 10/2013 | Sakaguchi et al. |
| 8,838,927 B2 | 9/2014 | Chiu et al. |
| 9,519,577 B2 | 12/2016 | Kruger |
| 9,619,155 B2 * | 4/2017 | Warfield ................. G06F 3/064 |
| 9,733,844 B2 | 8/2017 | Gong et al. |
| 10,042,754 B2 | 8/2018 | Moon et al. |
| 10,048,878 B2 | 8/2018 | Nam et al. |
| 2013/0159359 A1 | 6/2013 | Kumar et al. |
| 2013/0326113 A1 | 12/2013 | Wakrat et al. |
| 2019/0220218 A1 | 7/2019 | Deshe et al. |

OTHER PUBLICATIONS

XP009186070—JEDEC Standard, JESD220A (Revision of JESD220, Feb. 2011).

* cited by examiner

*Primary Examiner* — Gurtej Bansal
(74) *Attorney, Agent, or Firm* — F. Chau & Associates, LLC

(57) ABSTRACT

A storage device includes a nonvolatile memory device including a first region and a second region, and a controller that receives a first operation command including move attribute information and a first logical block address from an external host device and moves first data corresponding from the first region to the second region in response to the received first operation command, and when the first operation command does not include the move attribute information, the controller performs a first operation corresponding to the first operation command.

12 Claims, 26 Drawing Sheets

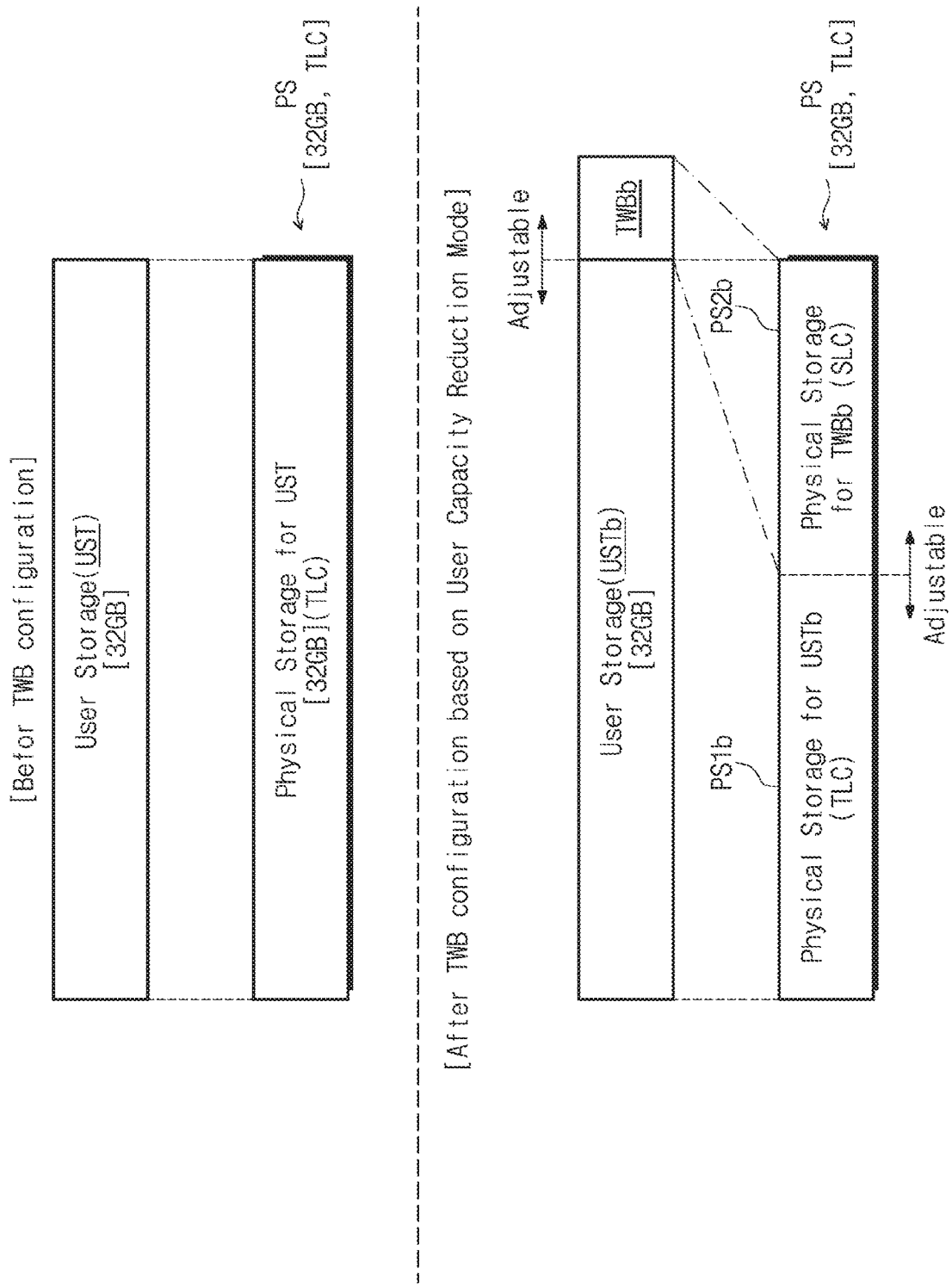

FIG. 14A

CMD UPIU

| Trans Type | Flags(MA) | LUN | Task Tag |
|---|---|---|---|
| IID / CST | Reserved | Reserved | Reserved |
| EHS Length | Reserved | Data Segment Length ||
| Expected Data Transfer Length ||||
| Command Descriptor Block (CDB) ||||
| Header ||||

# STORAGE DEVICE

CROSS-REFERENCE TO RELATED APPLICATIONS

This U.S. non-provisional patent application claims priority under 35 U.S.C. § 119 to Korean Patent Application No. 10-2019-0094250 filed on Aug. 2, 2019, in the Korean Intellectual Property Office, the disclosure of which is incorporated by reference in its entirety herein.

BACKGROUND

1. Technical Field

Embodiments of the inventive concept described herein relate to a semiconductor device, and more particularly relate to a storage device.

2. Discussion of Related Art

Semiconductor memories may be classified into volatile memory devices and nonvolatile memory devices. Volatile memory devices lose data stored therein at power-off, and include a static random access memory (SRAM) or a dynamic random access memory (DRAM). Nonvolatile memory devices retain data stored therein even at power-off, and include a flash memory device, a phase-change RAM (PRAM), a magnetic RAM (MRAM), a resistive RAM (RRAM), or a ferroelectric RAM (FRAM).

A flash memory device is widely used in a computing devices to store large quantities of data. A universal flash storage (UFS) interface defined by the JEDEC standard may support a higher operating speed than a conventional flash memory based storage device.

SUMMARY

At least one embodiment of the inventive concept provides a storage device having an improved reliability and reduced costs.

According to an exemplary embodiment of the inventive concept, a storage device includes a nonvolatile memory device including a first region, a second region, and a third region, and a controller that receives a first operation command including move attribute information and a first logical block address from an external host device and moves first data corresponding to the first logical block address to a region, which corresponds to the move attribute information, from among the first region, the second region, and the third region in response to the received first operation command, and when the first operation command does not include the move attribute information, the controller performs a first operation corresponding to the first operation command.

According to an exemplary embodiment of the inventive concept, a storage device includes a nonvolatile memory device including a first region, a second region and a third region, and a controller that receives a write command including a first logical block address and first data corresponding to the first logical block address from an external host device and writes the first data in one region of the first region, the second region, and the third region. The controller receives a first read command including the first logical block address from the external host device, reads the first data stored in one region of the region of the first region, the second region, and the third region in response to the first read command, and transfers the read first data to the external host device. The controller receives a second read command including the first logical block address and move attribute information from the external host device, moves the first data stored in one region of the first region, a second region, and the third region to another area, which corresponds to the move attribute information, from among the first region, the second region, and the third region without transferring the first data to the external host device.

According to an exemplary embodiment of the inventive concept, a storage device includes a nonvolatile memory device including a pinned turbo write buffer, a non-pinned turbo write buffer, and a user storage, wherein each of the pinned turbo write buffer and the non-pinned turbo write buffer includes a plurality of single level cells each storing one bit and the user storage includes a plurality of multi-level cells each storing a plurality of bits, and a controller that receive a first read command including a first logical block address and move attribute information from an external host device, reads first data corresponding to the first logical block address from one of the pinned turbo write buffer, the non-pinned turbo write buffer, and the user storage in response to the received read command, stores the read first data in another, which corresponds to the move attribute information, from among the pinned turbo write buffer, the non-pinned turbo write buffer, and the user storage, and invalidates the first data stored in the one of the pinned turbo write buffer, the non-pinned turbo write buffer, and the user storage. The controller omits an operation of transferring the first data to the external host device.

BRIEF DESCRIPTION OF THE FIGURES

The inventive concept will become apparent by describing in detail example embodiments thereof with reference to the accompanying drawings.

FIGS. 4A and 4B are diagrams for describing exemplary modes to configure a turbo write buffer of a storage device of FIG. 1.

FIGS. 14A to 14D are diagram illustrating various formats of a data packet exchanged between a host and a storage device of FIG. 1.

DETAILED DESCRIPTION OF THE EXEMPLARY EMBODIMENTS

Below, embodiments of the inventive concept are described in detail and clearly to such an extent that one of ordinary skill in the art can implement the inventive concept.

Components that are described in the detailed description with reference to the terms "unit", "module", or "block" and function blocks illustrated in drawings may be implemented with software, hardware, or a combination thereof. In an embodiment, the software may be a machine code, firmware, an embedded code, and application software. For example, the hardware may include an integrated circuit (IC), an application specific IC (ASIC), a field programmable gate array (FPGA), a complex programmable logic device (CPLD), a microelectromechanical system (MEMS), a processor, a passive element, or a combination thereof.

Figure 1:
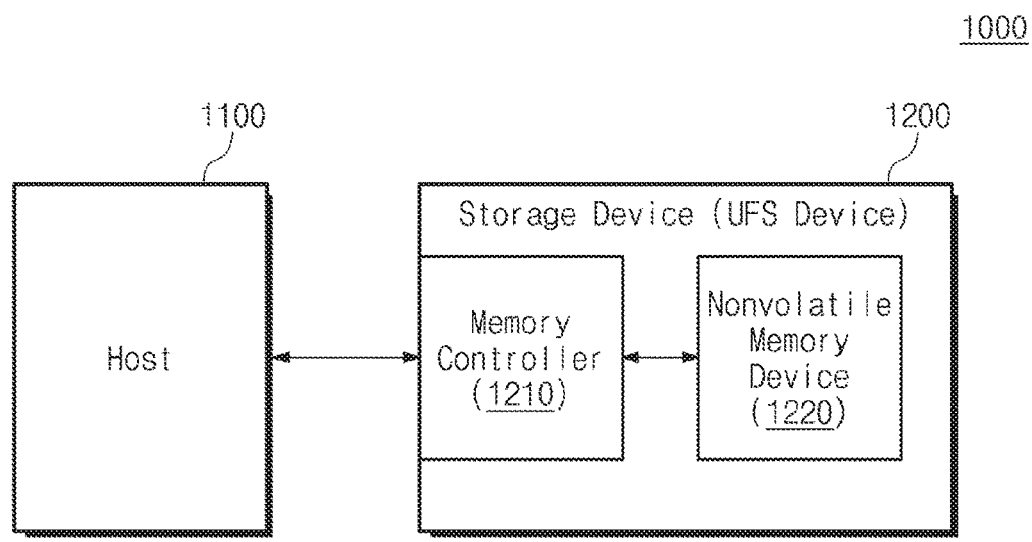
FIG. 1 is a block diagram illustrating a storage system according to an exemplary embodiment of the inventive concept.

FIG. 1 is a block diagram illustrating a storage system according to an exemplary embodiment of the inventive concept. Referring to FIG. 1, a storage system 1000 may include a host 1100 and a storage device 1200. In an exemplary embodiment of the inventive concept, the storage system 1000 may include one of various computing systems such as a personal computer, a notebook, a tablet, a smartphone, and a wearable device.

The host 1100 may store data in the storage device 1200 or may read data stored in the storage device 1200. For example, the host 1100 may transfer a write command and write data to the storage device 1200 to store data in the storage device 1200. Alternatively, to read data from the storage device 1200, the host 1100 may transfer a read command to the storage device 1200 and may receive data from the storage device 1200.

The host 1100 may include a main processor such as a central processing unit (CPU) or an application processor (AP). In addition, the host 1100 may include an auxiliary processor, which assists the main processor, such as a graphics processing unit (GPU) or a neural processing unit (NPU).

The storage device 1200 may operate under control of the host 1100. For example, the storage device 1200 may include a controller 1210 and a nonvolatile memory device 1220. The controller 1210, also referred to as a memory controller, may operate in response to a command received from the host 1100. For example, the controller 1210 may receive a write command and write data from the host 1100 and may store the received write data in the nonvolatile memory device 1220 in response to the received write command.

Alternatively, the controller 1210 may receive a read command from the host 1100 and may read data stored in the nonvolatile memory device 1220 in response to the received read command. Afterwards, the controller 1210 may transfer the read data to the host 1100. In an exemplary embodiment of the inventive concept, the nonvolatile memory device 1220 may be a NAND flash memory device, but the inventive concept is not limited thereto.

In an exemplary embodiment of the inventive concept, the host 1100 may communicate with the storage device 1200 based on a universal flash storage (UFS) interface or protocol defined by the JEDEC standard. For example, the host 1100 and the storage device 1200 may exchange packets in the form of a UFS protocol information unit (UPIU). The UPIU may include various information defined by an interface (e.g., a UFS interface) between the host 1100 and the storage device 1200. However, the inventive concept is not limited thereto. Below, for convenience of description, the terms "command", "UPIU", and "data" may be interchangeable, and the terms may have the same meaning or different meanings depending on the embodiments disclosed herein.

In an exemplary embodiment of the inventive concept, the storage device 1200 may support a turbo write function or a turbo write feature. The turbo write function may be enabled or disabled under control of the host 1100. When the turbo write function is enabled under control of the host 1100, the storage device 1200 may perform a turbo write operation. The turbo write operation may be performed based on a single level cell (SLC) buffering scheme but, not limited thereto, and may provide improved performance (in particular, improved write performance) of the storage device 1200. The turbo write operation will be more fully described with reference to drawings below.

Figure 2:
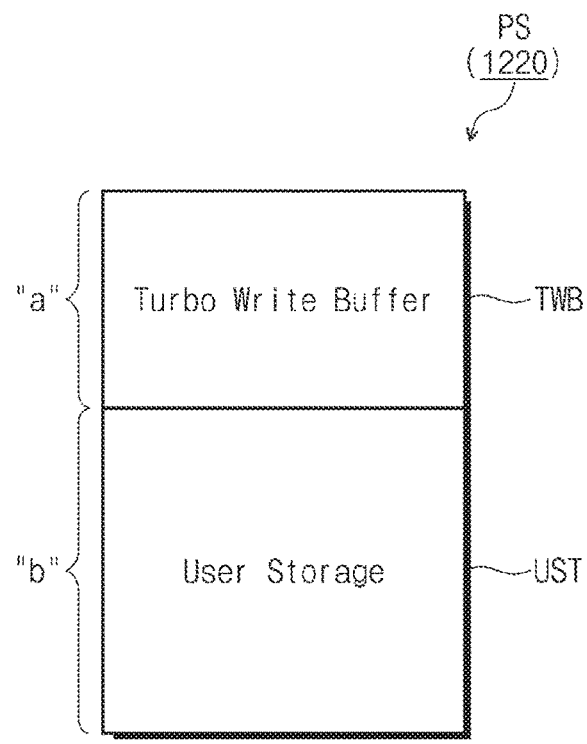
FIG. 2 is a diagram illustrating a physical storage space of a storage device of FIG. 1 according to an exemplary embodiment of the inventive concept.

FIG. 2 is a diagram illustrating a physical storage space PS of the storage device 1200 of FIG. 1. The physical storage space PS of the storage device 1200 may indicate a physical area of the nonvolatile memory device 1220, in which user data are actually stored. In other words, the physical storage space PS may be a space that is identified by the host 1100 as a capacity of the storage device 1200. The host 1100 and the storage device 1200 may be implemented in compliance with the UFS protocol proposed by JEDEC for the purpose of communicating with each other, but the inventive concept is not limited thereto.

In an exemplary embodiment of the inventive concept, the storage device 1200 may further include any other storage space (e.g., a space not identified by the host 1100 as a capacity of the storage device 1200, such as a reserved area, a meta area for storing meta data, or an overprovisioning area for improving performance), as well as the physical storage space PS illustrated in FIG. 2. However, for convenience of description, additional description associated with the other storage space will be omitted (or minimized), and a description will be focused on the physical storage space PS where user data are stored.

Referring to FIGS. 1 and 2, the physical storage space PS of the storage device 1200 may include a turbo write buffer area (TWB) (hereinafter referred to as a "turbo write buffer") and a user storage area (UST) (hereinafter referred to as a "user storage"). The user storage and the turbo write buffer may be referred to as a first region, a second region, a third region, etc.

The turbo write buffer TWB may correspond to a portion (e.g., "a") of the physical storage space PS of the nonvolatile memory device 1220. The user storage UST may correspond to the remaining portion (e.g., "b") of the physical storage space PS of the nonvolatile memory device 1220. Alternatively, the user storage UST may correspond to the entire (e.g., a+b) the physical storage space PS of the nonvolatile memory device 1220.

In an exemplary embodiment of the inventive concept, each memory cell corresponding to the turbo write buffer TWB may be an SLC, and each memory cell corresponding to the user storage UST may be a triple level cell (TLC). Alternatively, each of the memory cells corresponding to the turbo write buffer TWB may store n-bit data (n being a positive integer), and each of the memory cells corresponding to the user storage UST may store m-bit data (m being a positive integer greater than n). In other words, the turbo write buffer TWB may be an area supporting a higher write speed than the user storage UST.

The inventive concept is not limited to the above description regarding the turbo write buffer TWB and the user storage UST. For example, the number (e.g., k) of bits stored in each memory cell corresponding to the turbo write buffer TWB may be more than or equal to the number (e.g., i) of bits stored in each memory cell corresponding to the user storage UST (i.e., k≥i). In an exemplary embodiment of the inventive concept, in the turbo write buffer TWB and the user storage UST, the number of bits to be stored per memory cell may be determined by various factors of the storage device 1200 such as reliability and lifetime. Alternatively, the turbo write buffer TWB and the user storage UST may be divided by various factors such as reliability and lifetime of the storage device 1200, as well as the number of bits to be stored per memory cell.

In an exemplary embodiment of the inventive concept, each of the reference symbols "a" and "b" may be the number of memory blocks in the corresponding storage space. Values of "a" and "b" may be variously changed depending on sizes of the turbo write buffer TWB and the user storage UST and a scheme to implement the turbo write buffer TWB and the user storage UST (e.g., SLC, multi-level cell (MLC), TLC, and quad level cell (QLC)).

As described with reference to FIG. 1, the storage device 1200 may support a normal write function and a turbo write function. When the turbo write function is enabled by the host 1100, the storage device 1200 may perform the turbo write operation. When the turbo write function is disabled by the host 1100, the storage device 1200 may perform the normal write operation.

For example, in the case where the turbo write function is enabled, the storage device 1200 may preferentially write the write data received from the host 1100 in the turbo write buffer TWB. In this case, because write data received from the host 1100 are written in the turbo write buffer TWB (e.g., SLC program), a fast operating speed may be secured compared to the case where the normal write operation (e.g., TLC program) is performed on the user storage UST. In the case where the turbo write function is disabled, the storage device 1200 may not first write the write data in the turbo write buffer TWB. Depending on an internally assigned policy (e.g., a normal write policy), the storage device 1200 may directly write the write data in the user storage UST or may write the write data in the turbo write buffer TWB. How to write the write data may be determined based on various factors, such as the data share of the turbo write buffer TWB and a status of the physical storage space PS, depending on the normal write policy.

As another example, the normal write policy may first write the write data in the user storage UST. To explain the inventive concept more clearly, in the following detailed description, the normal write policy is a policy in which write data are preferentially written in the user storage UST. However, the inventive concept is not limited thereto.

In an exemplary embodiment of the inventive concept, data written in the turbo write buffer TWB may be flushed or migrated to the user storage UST depending on an explicit command from the host 1100 or an internally assigned policy.

Figure 3A:
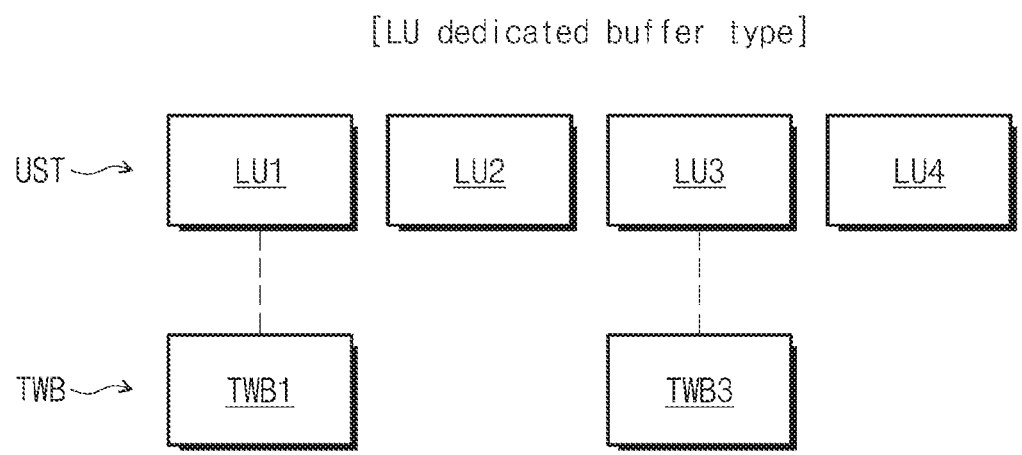
FIGS. 3A and 3B are diagrams for describing a turbo write buffer type of FIG. 2.
Figure 3B:
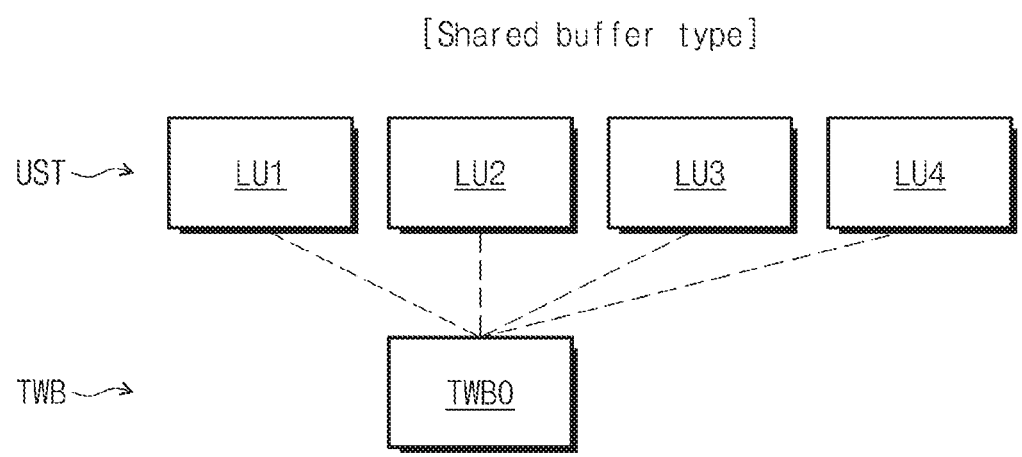

FIGS. 3A and 3B are diagrams for describing a turbo write buffer of FIG. 2. Referring to FIGS. 1, 2, 3A, and 3B, the storage device 1200 may include first, second, third and fourth logical units LU1, LU2, LU3 and LU4. Each of the first to fourth logical units LU1 to LU4 may be an externally addressable, independent, processing entity that processes a command from the host 1100. The host 1100 may manage the storage space of the storage device 1200 through the first to fourth logical units LU1 to LU4. Each of the first to fourth logical units LU1 to LU4 may be used to store data at the storage device 1200.

Each of the first to fourth logical units LU1 to LU4 may be associated with at least one memory block of the nonvolatile memory device 1220. Various kinds of logical units that are used for various purposes may exist. However, the first to fourth logical units LU1 to LU4 may correspond to the physical storage space PS and may be used to store data of the host 1100.

The first to fourth logical units LU1 to LU4 are illustrated in FIGS. 3A and 3B, but the inventive concept is not limited thereto. For example, the storage device 1200 may further include other logical units for storing and managing user data, as well as the first to fourth logical units LU1 to LU4. Alternatively, the storage device 1200 may further include other logical units for supporting various functions, as well as the first to fourth logical units LU1 to LU4.

The turbo write buffer TWB of the storage device 1200 may be configured in various types. The turbo write buffer TWB may be configured in one of a logical unit (LU) dedicated buffer type and a shared buffer type.

In the case of the LU dedicated buffer type, the turbo write buffer TWB may be configured independently or individually for each logical unit LU. For example, as illustrated in FIG. 3A, in the LU dedicated buffer type, a first turbo write buffer TWB1 may be configured with respect to the first logical unit LU1 of the first to fourth logical units LU1 to LU4, and a third turbo write buffer TWB3 may be configured with respect to the third logical unit LU3 of the first to fourth logical units LU1 to LU4.

In the LU dedicated buffer type of FIG. 3A, in the case where the write command for the first logical unit LU1 is received after the turbo write is enabled, the write data may be preferentially written in the first turbo write buffer TWB1 corresponding to the first logical unit LU1. In the case where the write command for the third logical unit LU3 is received after the turbo write function is enabled, the write data may be preferentially written in the third turbo write buffer TWB3 corresponding to the third logical unit LU3.

In the case where there are received write commands for the second and fourth logical units LU2 and LU4 to which the turbo write buffers TWB are not assigned, the write data may be written in the user storage UST corresponding to the second and fourth logical units LU2 and LU4. In addition, in the case where the write command for the first logical unit LU1 or the third logical unit LU3 is received after the turbo write is disabled, depending on the normal write policy, the write data may be written in the user storage UST of the first logical unit LU1 or the first turbo write buffer TWB1 or may be written in the user storage UST of the third logical unit LU3 or the third turbo write buffer TWB3.

In an exemplary embodiment of the inventive concept, capacities of the first and third turbo write buffers TWB1 and TWB3 may be set independently of each other. However, the inventive concept is not limited thereto. For example, the number of logical units to which turbo write buffers are respectively assigned, a capacity of each turbo write buffer, etc., may be variously changed or modified.

In an exemplary embodiment of the inventive concept, a size of the turbo write buffer TWB for each logical unit may be set to a turbo write buffer size field per unit (e.g., "dLUNumTurboWriteBufferAllocUnits") of a unit descriptor. In an exemplary embodiment of the inventive concept, the turbo write buffer size field per unit (e.g., "dLUNumTurboWriteBufferAllocUnits") may be a configurable parameter.

In the case of the shared buffer type, one turbo write buffer may be configured with respect to all the logical units. For example, as illustrated in FIG. 3B, in the shared buffer type, there may be configured one turbo write buffer TWB0 shared by all the first to fourth logical units LU1 to LU4.

In this case, when a write command for each of the first to fourth logical units LU1 to LU4 is received after the turbo write function is enabled, the write data may be first written in the shared turbo write buffer TWB0. In the case where the write command for each of the first to fourth logical units LU1 to LU4 is received after the turbo write is disabled, the write data may be written in each of the first to fourth logical units LU1 to LU4 or in the shared turbo write buffer TWB0 according to the normal write policy.

As described above, the storage device 1200 may include the turbo write buffer TWB for supporting the turbo write function. Depending on a buffer type (e.g., the LU dedicated buffer type or the shared buffer type), the turbo write buffer TWB may be configured with respect to each of a plurality of logical units or one turbo write buffer TWB may be configured to be shared by all of the logical units.

Figure 4A:
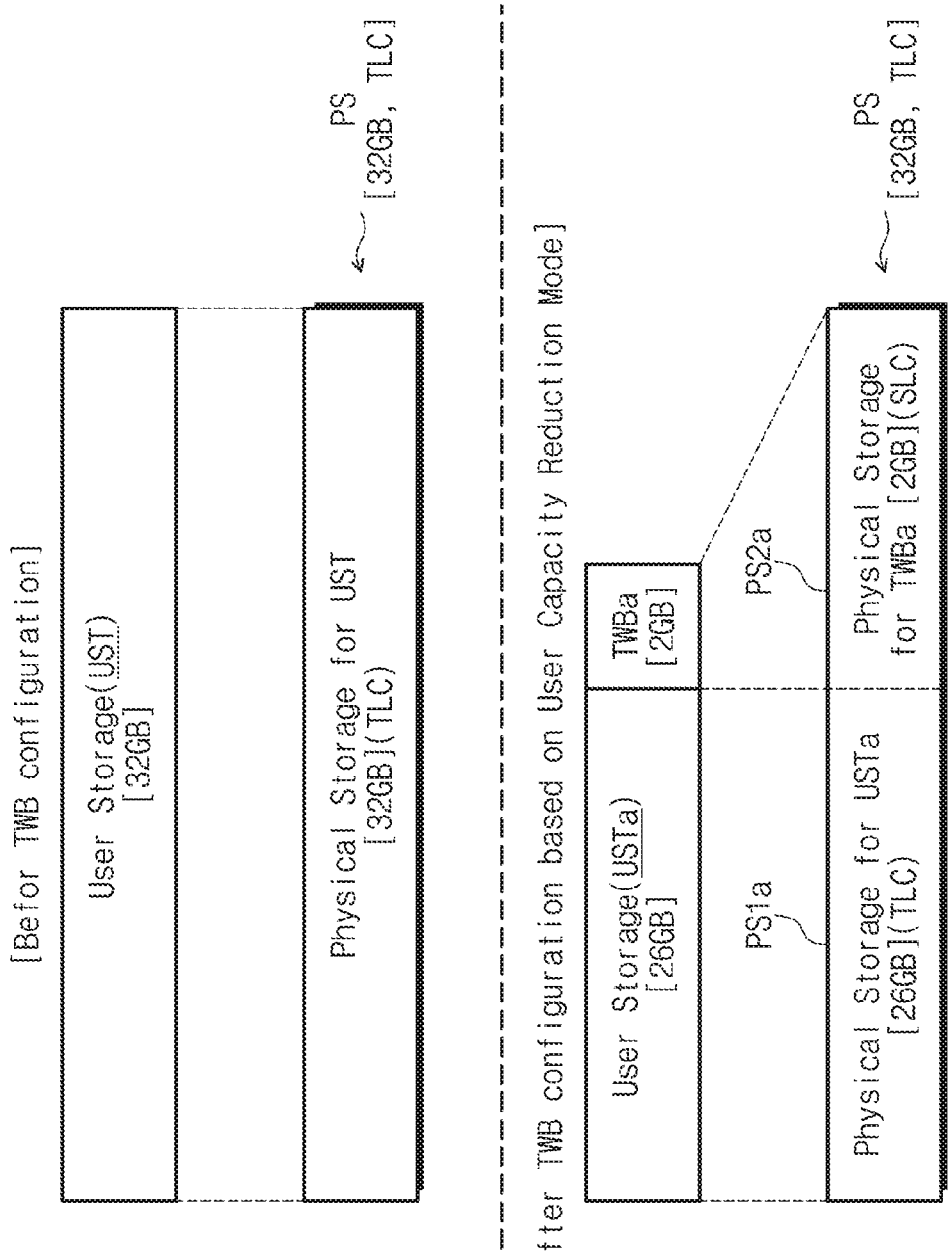

FIGS. 4A and 4B are diagrams for describing modes to configure a turbo write buffer of a storage device of FIG. 1. Below, for convenience of description, it is assumed that the physical storage space PS of the storage device 1200 is 32 GB on the basis of the TLC. In other words, in the case where each memory cell included in the storage device 1200 stores 3-bit data, the storage device 1200 may store user data of 32 GB.

However, the inventive concept is not limited thereto. For example, the physical storage space PS of the storage device 1200 may be variously changed depending on a scheme to implement the storage device 1200 or the nonvolatile memory device 1220, for example, depending on a memory cell type (e.g., SLC, MLC, TLC, or QLC), the number of memory cells, a memory cell structure, an overprovisioning ratio, etc.

Referring to FIGS. 1, 4A, and 4B, the storage device 1200 may configure a physical storage space of the turbo write buffer TWB depending on various modes. For example, the storage device 1200 may configure a physical storage space of a turbo write buffer based on one of a user capacity reduction mode and a no user capacity reduction mode.

The user capacity reduction mode may be a mode to reduce a user capacity of user storage USTa for the purpose of configuring a turbo write buffer TWBa. For example, as illustrated in FIG. 4A, the physical storage space PS of the storage device 1200 may be 32 GB on the basis of the TLC.

Before the turbo write buffer TWB is configured, the capacity of 32 GB (e.g., the entire capacity of the physical storage space PS) may be assigned to the user storage UST or may be used for the user storage UST. In this case, the user storage UST may be recognized to be 32 GB from a point of view of the host 1100.

The turbo write buffer TWB may be configured depending on the user capacity reduction mode. In this case, a second physical storage space PS2a, which is a portion of the physical storage space PS, may be assigned to a turbo write buffer TWBa or may be used for the turbo write buffer TWBa.

In addition, a first physical storage space PS1a, which is a portion of the physical storage space PS, may be assigned to the user storage USTa or may be used for the user storage USTa. In this case, compared with the case where the turbo write buffer TWBa is not configured, the capacity of the user storage USTa may decrease (e.g., from 32 GB to 26 GB) from a point of view of the host 1100.

In an exemplary embodiment of the inventive concept, the first physical storage space PS1a corresponding to the user storage USTa may be implemented with the TLC, and the second physical storage space PS2a corresponding to the turbo write buffer TWBa may be implemented with the SLC. A ratio of capacities when the same storage space is used as the TLC and the SLC may be "3:1".

In other words, when the size of the turbo write buffer TWBa increases as much as 1 GB, a size of a logical storage space of the user storage USTa may decrease as much as 3 GB. As described above, in the case where the turbo write buffer TWBa is configured in the user capacity reduction mode, a portion of the physical storage space PS of the storage device 1200 may be assigned for the turbo write buffer TWBa, and thus, a capacity of the user storage USTa identified by the host 1100 may be decreased.

In an exemplary embodiment of the inventive concept, the first physical storage space PS1a corresponding to the user storage USTa and the second physical storage space PS2a corresponding to the turbo write buffer TWBa may be physically adjacent to each other or may be physically spaced from each other.

The no user capacity reduction mode may be a mode in which a logical storage capacity of user storage USTb recognized by the host 1100 is not reduced even though a turbo write buffer TWBb is configured. For example, as illustrated in FIG. 4B, before the configuration of the turbo write buffer TWB, the user storage UST may have the capacity of 32 GB. In other words, the physical storage space PS of the storage device 1200 may be assigned to the user storage UST or may be used for the user storage UST.

In the case where the turbo write buffer TWB is configured based on the no user capacity reduction mode, the turbo write buffer TWBb having a particular capacity (e.g., 2 GB) may be configured. A second physical storage space PS2b, which is a portion of the physical storage space PS, may be assigned to the turbo write buffer TWBb or may be used for the turbo write buffer TWBb.

Unlike the user capacity reduction mode, the user storage USTb in the no user capacity reduction mode may maintain the capacity of 32 GB. In other words, in the no user capacity reduction mode, even though the turbo write buffer TWBb is configured, the capacity of the user storage UST identified from a point of view of the host 1100 may be identical to that before the configuration of the turbo write buffer TWBb.

In an exemplary embodiment of the inventive concept, in the no user capacity reduction mode, a size or configuration of the turbo write buffer TWBb may be varied by an internal policy of the storage device 1200 or an explicit request from the host 1100. For example, because the second physical storage space PS2*b*, which is a portion of the physical storage space PS, is used to configure the turbo write buffer TWBb, the first physical storage space PS1*b* to be used for the user storage USTb may be smaller than a capacity of the user storage USTb.

In other words, in the case where the entire first physical storage space PS1*b* is used to store user data or an available free capacity of the first physical storage space PS1*b* is equal to or smaller than a reference value, all or a portion of the second physical storage space PS2*b* used for the turbo write buffer TWBb may be returned to the user storage USTb.

In other words, in the physical storage space PS, in the case where the turbo write buffer TWBb cannot be maintained due to a lack of the available space for the user storage USTb, the second physical storage space PS2*b* assigned for the turbo write buffer TWBb may be returned to the user storage USTb. The above-described return operation may be performed, for example, through a user data flush operation and an operation of setting a turbo write buffer size.

In an exemplary embodiment of the inventive concept, the host 1100 may check a current available size of the turbo write buffer TWB of the storage device 1200. For example, the storage device 1200 may set information about a current size of the turbo write buffer TWB at a current turbo write buffer size field (e.g., "dCurrentTurboWriteBufferSzie") of attributes. In addition, the storage device 1200 may set information about a ratio of a current available capacity of the turbo write buffer TWB at an available turbo write buffer size field (e.g., "dAvailableTurboWriteBufferSize") thereof.

The host 1100 may check a current available size of the turbo write buffer TWB by checking the current turbo write buffer size field and the available turbo write buffer size field of the attributes. Based on the checked information, the host 1100 may change a policy to use the turbo write or may return a physical storage space used for the turbo write buffer TWB to the user storage UST.

As another example, the storage device 1200 may autonomously return a physical storage space used for the turbo write buffer TWB to the user storage UST. For example, the storage device 1200 could periodically compare the available space of the user storage UST against a reference value to determine whether it needs to return the physical storage space used for the turbo write buffer TWB to the user storage UST. The storage device 1200 may set a status flag to indicate the turbo write buffer TWB is no longer available when it has returned the physical storage space used for the turbo write buffer TWB to the user storage UST. The status flag may be stored in a register in the storage device 1200. The host 1100 may check a changed status of the turbo write buffer TWB through the current turbo write buffer size field. The storage device 1200 could set the current turbo write buffer size field to 0 upon returning the physical storage space used for the turbo write buffer TWB to the user storage UST.

In an exemplary embodiment of the inventive concept, the storage device 1200 may provide information about a lifetime of the turbo write buffer TWB based on the number of program/erase (P/E) cycles of a physical storage space (or a memory block) assigned or used for the turbo write buffer TWB. For example, the storage device 1200 may set information about a lifetime of the turbo write buffer TWB at a turbo write buffer lifetime estimation field (e.g., "dTurboWriteBufferLifeTimeEst") of the attributes.

The host 1100 may estimate the lifetime of the turbo write buffer TWB by checking the turbo write buffer lifetime estimation field of the attributes of the storage device 1200 through a query request. In an exemplary embodiment of the inventive concept, in the no user capacity reduction mode, because the user storage UST and the turbo write buffer TWB share the physical storage space PS, in the case where a write operation is performed on the user storage UST, the lifetime of the turbo write buffer TWB may decrease.

Figure 5:
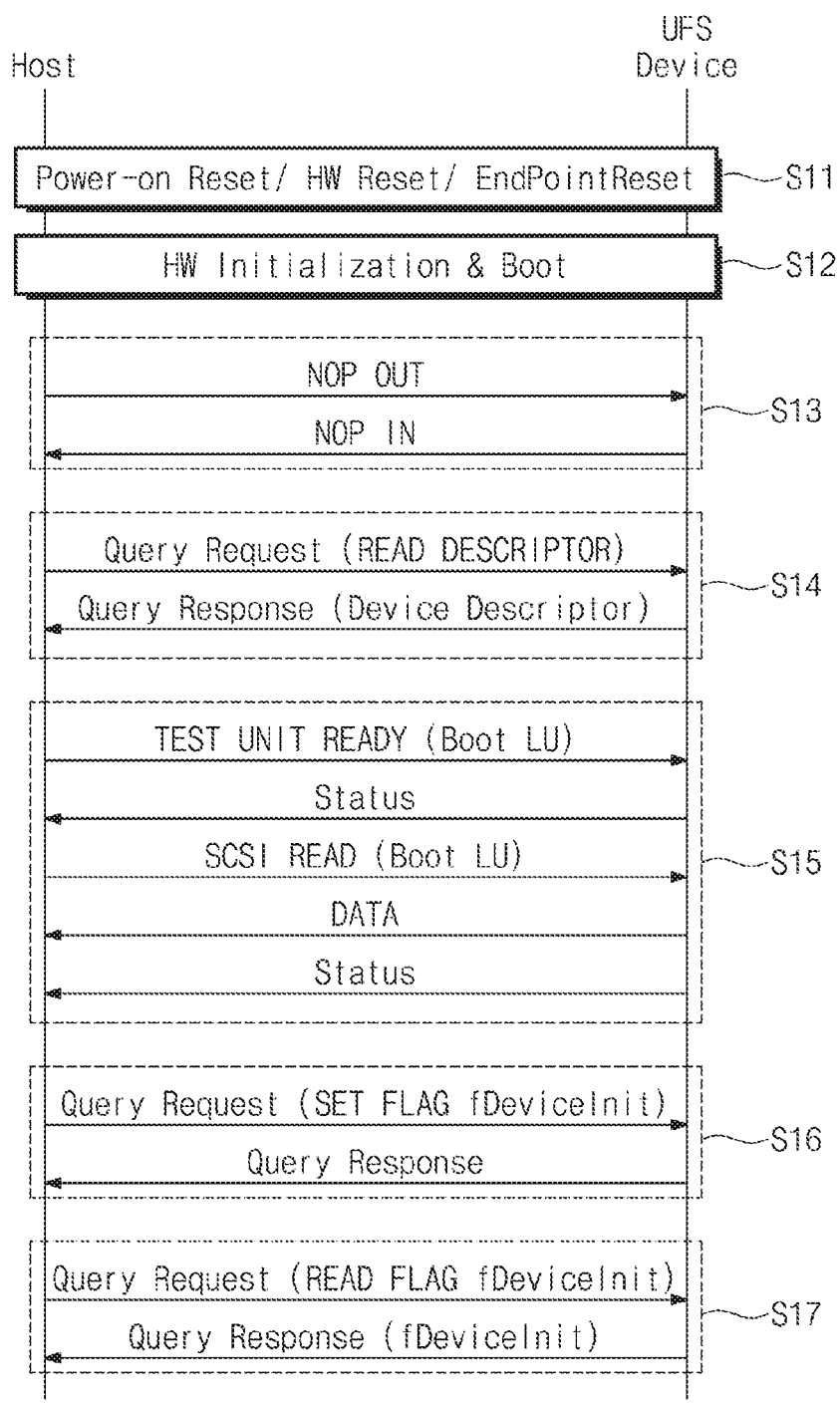
FIG. 5 is a flowchart illustrating an operation of a storage system of FIG. 1 according to an exemplary embodiment of the inventive concept.

FIG. 5 is a flowchart illustrating an operation of a storage system of FIG. 1. An initialization operation of the storage system 1000 is described with reference to FIG. 5. Referring to FIGS. 1, 2, and 5, in operation S11, the host 1100 and the storage device 1200 may perform an operation such as a power-on reset operation, a hardware reset operation, or an endpoint reset operation.

In operation S12, the host 1100 and the storage device 1200 may perform hardware reset and booting. For example, hardware layers of each of the host 1100 and the storage device 1200 may be initialized and booted.

In operation S13, the host 1100 and the storage device 1200 may perform initialization on a particular layer (e.g., an UFS transport (UTP) layer). For example, the host 1100 may transfer the NOP OUT UPIU to the storage device 1200. The storage device 1200 may transfer the NOP IN UPIU to the host 1100 in response to the NOP OUT UPIU.

In operation S14, the host 1100 may check a device descriptor from the storage device 1200. For example, the host 1100 may transfer a query request for reading a descriptor to the storage device 1200. The storage device 1200 may transfer a query response, which includes the device descriptor, to the host 1100 in response to the query request. The query request may include a read descriptor. For example, the read descriptor may indicate to the storage device 1200 that an external device desires the device descriptor.

In an exemplary embodiment of the inventive concept, the host 1100 may check a configuration and a function of the storage device 1200 through the device descriptor. For example, the device descriptor may include an extended UFS function support field (e.g., "dExtendedUFSFeaturesSupport") including information about whether to support the turbo write function. In an exemplary embodiment of the inventive concept, the information about whether to support the turbo write function may be set to a particular bit (e.g., bit[8]) of the extended UFS function support field.

The device descriptor may further include a turbo write buffer no user space reduction enable field (e.g., "bTurboWriteBufferNoUserSpaceReductionEn") including information about a turbo write buffer mode. In the case where a value of the turbo write buffer no user space reduction enable field is "00h", the turbo write buffer TWB may be configured depending on the user capacity reduction mode described with reference to FIG. 4A. In the case where a value of the turbo write buffer no user space reduction enable field is "01h", the turbo write buffer TWB may be configured depending on the no user capacity reduction mode described with reference to FIG. 4B.

The device descriptor may further include a turbo write buffer type field (e.g., "bTurbowriteBufferType") including information about a turbo write buffer type. In the case where a value of the turbo write buffer type field is "00h", the turbo write buffer TWB may be configured depending on the LU dedicated buffer type described with reference to FIG. 3A. In the case where a value of the turbo write buffer type field is "01h", the turbo write buffer TWB may be configured depending on the shared buffer type described with reference to FIG. 3B.

The device descriptor may further include a shared turbo write buffer allocation number field (e.g., "dNumSharedTurboWriteBufferAllocUnits") including information about a size of a turbo write buffer. In the case where the number of units assigned to a shared turbo write buffer is set to "0", a turbo write buffer of the shared buffer type may not be configured.

The above-described fields are merely exemplary, and the inventive concept is not limited thereto. For example, the device descriptor may further include other fields including information about a configuration, a structure, a function, etc., of the storage device 1200, as well as the above-described fields. Various fields of the device descriptor may indicate values that are set before the initialization operation. The host 1100 may identify a current status of the storage device 1200 by reading various fields of the device descriptor.

In an exemplary embodiment of the inventive concept, the above-described fields of the device descriptor, such as "bTurboWriteBufferNoUserSpaceReductionEn", "bTurboWriteBufferType", and "dNumSharedTurboWriteBufferAllocUnits", may be varied by writing a value of a corresponding field of a configuration descriptor. In other words, the host 1100 may vary information such as a turbo write buffer type, turbo write buffer no user space reduction enable, and the number of units assigned to a turbo write buffer, by writing values of various fields of the configuration descriptor. In an exemplary embodiment of the inventive concept, a geometry descriptor of the storage device 1200 may include information such as a turbo write buffer maximum size field, a turbo write buffer maximum number field, a turbo write buffer capacity adjustment factor field, a supported turbo write buffer no user capacity reduction type field, a supported turbo write buffer type field, etc.

For example, the turbo write buffer maximum size field (e.g., "dTurboWriteBufferMaxNAllocUnits") may include information about a maximum size of the turbo write buffer TWB supported at the storage device 1200. The turbo write buffer maximum number field (e.g., "bDeviceMaxTurboWriteLUs") may include information about the maximum number of turbo write buffers supported at the storage device 1200.

The turbo write buffer capacity adjustment factor field (e.g., "bTurboWriteBufferCapAdjFac") may include information about a capacity reduction factor according to a kind of turbo write buffer memory. For example, in the case where the turbo write buffer TWB is implemented with the SLC and the user storage UST is implemented with the TLC, a value of the turbo write buffer capacity adjustment factor field may be "3". In the case where the turbo write buffer TWB is implemented with the SLC and the user storage UST is implemented with the MLC, a value of the turbo write buffer capacity adjustment factor field may be "2".

The supported turbo write buffer no user capacity reduction type field (e.g., "bSupportedTurboWriteBufferNoUserSpaceReductionTypes") may include information about whether the storage device 1200 supports any turbo write buffer mode (e.g., the user capacity reduction mode, the no user capacity reduction mode, or both).

The supported turbo write buffer type field (e.g., "bSupportedTurboWriteBufferTypes") may include information about whether the storage device 1200 supports any turbo write buffer type (e.g., the LU dedicated buffer type, the shared buffer type, or both).

The above-described fields are merely exemplary, and the inventive concept is not limited thereto.

In operation S15, the host 1100 may download a boot code from the storage device 1200. For example, the host 1100 may transfer the TEST UNIT READY UPIU to the storage device 1200. The storage device 1200 may transfer status information in response to the received TEST UNIT READY UPIU. The host 1100 may determine whether a boot logical unit (or a boot well-known LU) of the storage device 1200 is accessible, based on the received status information.

In the case where the boot logical unit is accessible, the host 1100 may transfer a SCSI READ command to the storage device 1200. In an exemplary embodiment of the inventive concept, the SCSI READ command may correspond to the boot logical unit. The storage device 1200 may transfer data "DATA" and status information to the host 1100 in response to the received command.

In operation S16, the host 1100 may complete the initialization operation by setting a flag of the storage device 1200. For example, the host 1100 may transfer the query request to the storage device 1200. The query request may be a request for setting a device initialization field (e.g., "fDeviceInit") included in the flag of the storage device 1200. In response to the query request, the device initialization field included in the flag of the storage device 1200 may be set to a particular value (e.g., "01h"). Afterwards, the storage device 1200 may transfer a query response.

In operation S17, the host 1100 may poll the device initialization field (e.g., "fDeviceInit") of the flag of the storage device 1200. For example, the host 1100 may transfer a query request for reading the device initialization field of the flag to the storage device 1200, and the storage device 1200 may transfer a query response, in which the device initialization field is included, to the host 1100.

In an exemplary embodiment of the inventive concept, after operation S16, in the case where the initialization operation of the storage device 1200 is completed, the device initialization field may be reset to a different value (e.g., "00h"). In other words, the host 1100 may repeatedly perform operation S17 to check whether the device initialization field is reset. In the case where the device initialization field is reset, the initialization operation of the host 1100 and the storage device 1200 may be completed.

Figure 6:
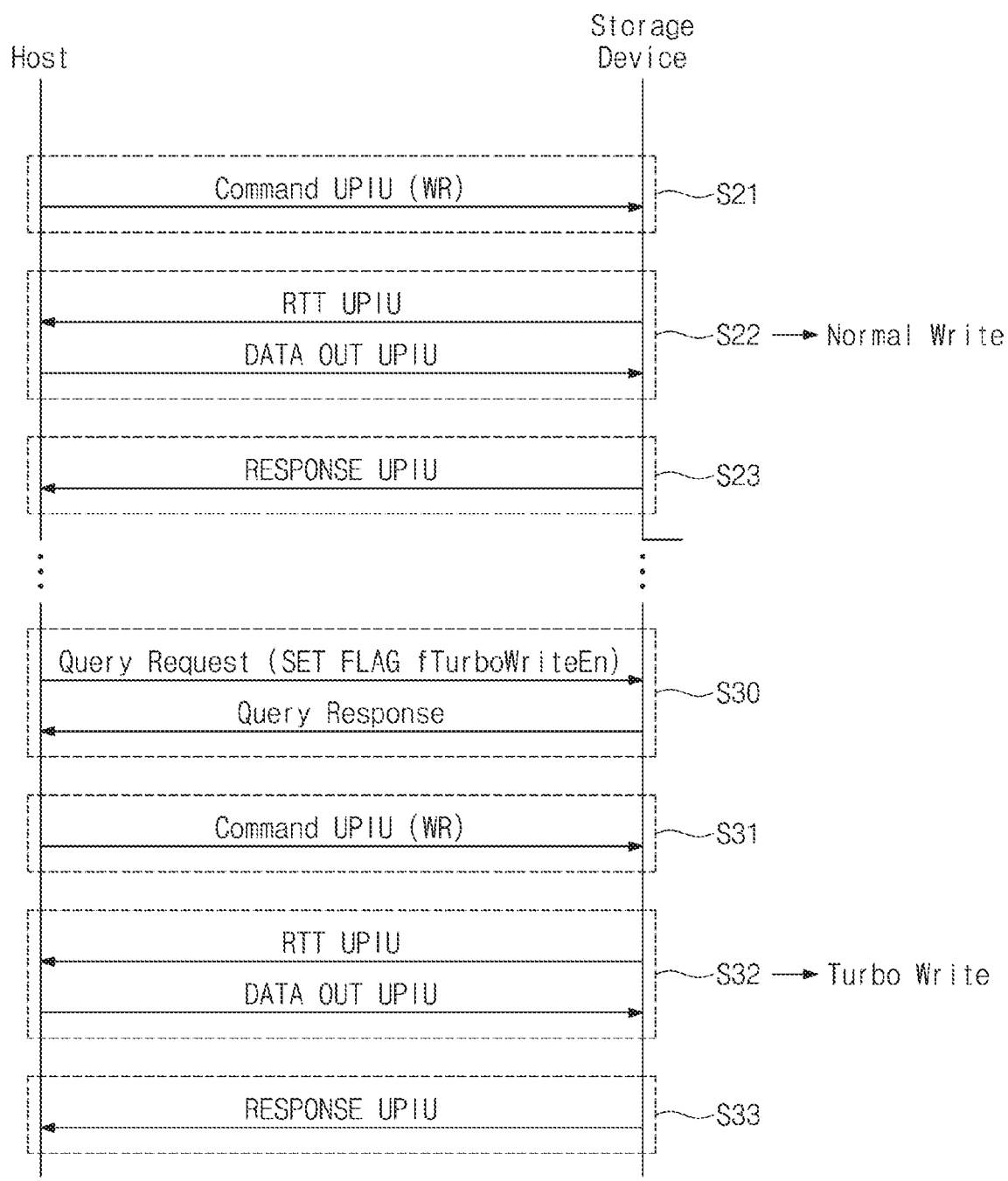
FIG. 6 is a flowchart illustrating an operation of a storage system of FIG. 1 according to an exemplary embodiment of the inventive concept.

FIG. 6 is a flowchart illustrating an operation of a storage system of FIG. 1. A write operation of the storage system 1000 will be described with reference to FIG. 6. Referring to FIGS. 1 and 6, in operation S21, the host 1100 may transfer a CMD UPIU including a write command WR CMD to the storage device 1200.

In operation S22, the host 1100 and the storage device 1200 may perform data transaction. For example, the storage device 1200 may transfer a ready to transfer UPIU (RTT UPIU) to the host 1100. The RTT UPIU may include information about a data range where the storage device 1200 is able to receive data. The host 1100 may transfer a DATA OUT UPIU including the write data to the storage device 1200 in response to the RTT UPIU. As the above-described operation is repeatedly performed, the write data may be transferred from the host 1100 to the storage device 1200.

After all of the write data are received, in operation S23, the storage device 1200 may transfer a RESPONSE UPIU to the host 1100. The RESPONSE UPIU may include information indicating that an operation corresponding to the write command received in operation S21 is completed.

In an exemplary embodiment of the inventive concept, the storage device 1200 may perform a normal write operation on the write data received in operation S22. For example, in operation S21, the storage device 1200 may determine whether the turbo write function is enabled. More specifically, the storage device 1200 may determine whether the turbo write function is enabled, based on a value of a turbo write enable field (e.g., "fTurboWriteEn") of the flag.

In the case where a value of the turbo write enable field is "0b", the turbo write function may be in a disabled state. In the case where a value of the turbo write enable field is "1b", the turbo write function may be in an enabled state. In an exemplary embodiment of the inventive concept, a value of the turbo write enable field of the flag may be set by a query request for a set flag of the host 1100.

A value of the turbo write enable field may not be set by the host 1100. In this case, the write data received in operation S22 may be written in the turbo write buffer TWB or the user storage UST in compliance with the normal write policy.

In operation S30, the host 1100 may set a value of the turbo write enable field to a particular value (e.g., "1b"). For example, the host 1100 may transfer a query request for setting a value of the turbo write enable field to a particular value (e.g., "1b") to the storage device 1200. A value of the turbo write enable field may be set to a particular value (e.g., "1b") in response to the query request from the host 1100, and the storage device 1200 may transfer a query response to the host 1100.

Afterwards, the host 1100 may perform operation S31 to operation S33. Operation S31 to operation S33 may be similar to operation S21 to operation S23 except that the turbo write is performed depending on the turbo write enable field, and thus, additional description will be omitted to avoid redundancy.

In an exemplary embodiment of the inventive concept, the write data received in operation S32 may be written in the turbo write buffer TWB. For example, in operation S30, as a value of the turbo write enable field is set to a particular value (e.g., "1b"), the turbo write function may be enabled. In this case, the write data received from the host 1100 may be written in the turbo write buffer TWB. For example, in operation S31, the data received from the host 1100 may be stored in the pinned turbo write buffer TWB-p or the non-pinned turbo write buffer TWB-np depending on a particular factor value of the command UPIU. How to configure a turbo write buffer divided into the pinned turbo write buffer TWB-p and the non-pinned turbo write buffer TWB-np will be more fully described with reference to FIG. 8.

In an exemplary embodiment of the inventive concept, even though the turbo write function is enabled, in the case where a space of the turbo write buffer TWB is insufficient, the storage device 1200 may write the received write data in the user storage UST.

Figure 7:
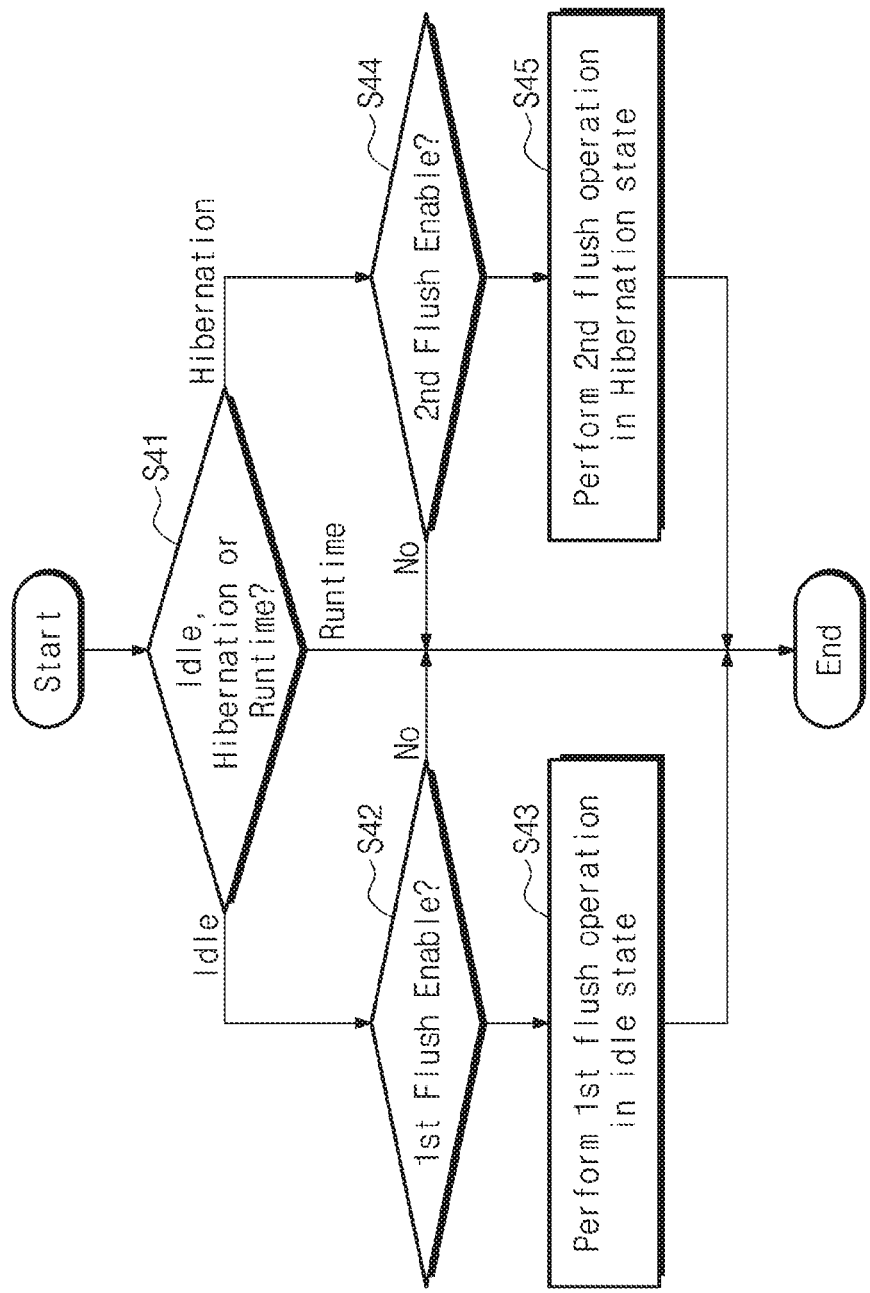
FIG. 7 is a flowchart illustrating an operation of a storage device of FIG. 1 according to an exemplary embodiment of the inventive concept.

FIG. 7 is a flowchart illustrating an operation of a storage device of FIG. 1. A flush operation of the storage device 1200 will be described with reference to FIG. 7. Referring to FIGS. 1, 2, and 7, in operation S41, the storage device 1200 may determine whether a current state is an idle state, a hibernation state, or a runtime state. When the storage device 1200 is in the runtime state, a separate flush operation may not be performed.

For example, when the storage device 1200 is processing a command received from the host 1100, the storage device 1200 may be in the runtime state. When a command (e.g., a pending command) that is received from the host 1100 and is being processed or to be processed does not exist, the storage device 1200 may be in the idle state. When the storage device 1200 enters a low-power mode called "hibernation" by the initiation of the storage device 1200 or the host 1100, the storage device 1200 may be in the hibernation state.

When the storage device 1200 is in the idle state, in operation S42, whether a first flush operation is enabled may be determined. The host 1100 may allow or prohibit the first flush operation at the storage device 1200 by setting a value of a turbo write buffer flush enable field (e.g., "fTurboWriteBufferFlushEn") of the flag. The storage device 1200 may determine whether the first flush operation is enabled, by checking a value of the turbo write buffer flush enable field of the flag.

In an exemplary embodiment of the inventive concept, when a value of the turbo write buffer flush enable field of the flag is "0b", the first flush operation may be disabled or prohibited. When a value of the turbo write buffer flush enable field of the flag is "1b," the first flush operation may be enabled. In the case where the first flush operation is disabled, the storage device 1200 may not perform a separate flush operation.

In the case where the first flush operation is enabled, in operation S43, the storage device 1200 may perform the first flush operation during the idle state. The first flush operation may be a flush operation that the storage device 1200 performs in the idle state. The flush operation may be an operation of flushing or migrating user data written in the turbo write buffer TWB to the user storage UST, depending on the internal policy or the explicit command from the host 1100.

In an exemplary embodiment of the inventive concept, when the user data written in the turbo write buffer TWB are flushed to the user storage UST, a logical address of the flushed user data may be maintained, and a physical address may be changed. In this case, the storage device 1200 may update mapping information of the logical address and the physical address of the flushed user data. For example, the physical address may be changed from an address of the turbo write buffer TWB to an address of the user storage UST.

When a determination result of operation S41 indicates that the storage device 1200 is in the hibernation state, in operation S44, the storage device 1200 may determine whether a second flush operation is enabled. As in the above description, for example, the host 1100 may allow or prohibit the second flush operation at the storage device 1200 by setting a value of a turbo write buffer flush enable field during hibernation (e.g., "fTurboWriteBufferFlushDuringHibernat") of the flag.

The storage device 1200 may determine whether the second flush operation is enabled, by checking the value of the turbo write buffer flush enable field during hibernation of the flag. In an exemplary embodiment of the inventive concept, when a value of the turbo write buffer flush enable field during hibernation of the flag is "0b", the second flush operation may be disabled or prohibited. When a value of the turbo write buffer flush enable field during hibernation of the flag is "1b", the second flush operation may be enabled. In the case where the second flush operation is disabled, the storage device 1200 may not perform a separate flush operation.

In the case where the second flush operation is enabled, in operation S45, the storage device 1200 may perform the second flush operation during the hibernation state. The second flush operation may indicate a flush operation that the storage device 1200 performs in the hibernation state.

According to the above flush operation, user data written in the turbo write buffer TWB may be flushed or migrated to the user storage UST. As such, an available buffer size of the turbo write buffer TWB may be secured.

In an exemplary embodiment of the inventive concept, the above flush operation may be suspended under a particular condition. For example, the first flush operation that is performed in the idle state may be performed only in a state where a command queue of the storage device 1200 is empty. While the first flush operation is performed, in the case where a command is issued from the host 1100, the storage device 1200 may suspend the first flush operation being performed and may first process the command issued from the host 1100. In an exemplary embodiment of the inventive concept, in the case where the hibernation mode is terminated, the second flush operation that is performed in the hibernation state may be stopped.

As described above, a flush operation being performed may be suspended depending on a particular condition. In this case, the storage device 1200 may set suspension information (or information of the progress degree) or a current status of the flush operation at a turbo write buffer flush status field (e.g., "bTurboWriteBufferFlushStatus") of the attributes.

In an exemplary embodiment of the inventive concept, the storage device 1200 may set information, which indicates that a flush operation for the turbo write buffer TWB is required, to a particular value (e.g., bit[5]) of an exception event status (e.g., "dExceptionEventStatus") of the attributes. The host 1100 may check the particular value (e.g., bit[5]]) of the exception event status of the attributes, may determine that a flush operation is required at the storage device 1200, and may set particular fields (e.g., "fTurboWriteBufferFlushEn" and "fTurboWriteBufferFlushDuringHibernate") of the flag of the storage device 1200 in compliance with a policy.

The description is given with reference to FIG. 7 as the storage device 1200 performs a flush operation based on a value of a flush enable field (i.e., a value of the turbo write buffer flush enable field or a value of the turbo write buffer flush enable field during hibernation), but the inventive concept is not limited thereto. In an exemplary embodiment, the storage device 1200 performs a flush or migration operation depending on an internal policy, regardless of a value of the flush enable field (i.e., a value of the turbo write buffer flush enable field or a value of the turbo write buffer flush enable field during hibernation). In this case, the storage device 1200 may perform the flush or migration operation depending a result of determination that is automatically made by the storage device 1200 (without intervention of the outside, or according to its own determination).

Figure 8:
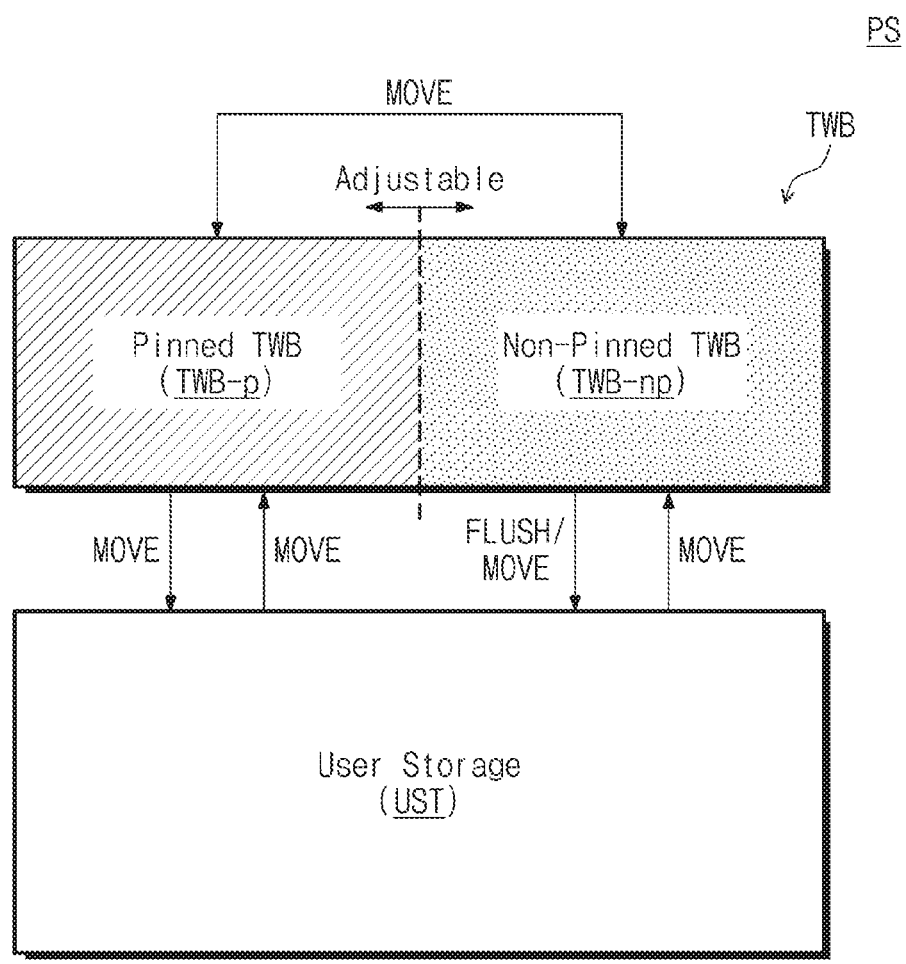
FIG. 8 is a block diagram illustrating a physical storage space of a storage device of FIG. 1 according to an exemplary embodiment of the inventive concept.

FIG. 8 is a block diagram illustrating a physical storage space of the storage device 1200 of FIG. 1. Referring to FIGS. 1 and 8, the physical storage space PS of the storage device 1200 may include the turbo write buffer TWB and the user storage UST. The physical storage space PS, the turbo write buffer TWB, and the user storage UST of the storage device 1200 are described above, and thus, additional description may be omitted to avoid redundancy.

The turbo write buffer TWB may be divided into a pinned turbo write buffer TWB-p and a non-pinned turbo write buffer TWB-np. As in the above description, in the case where the turbo write function of the storage device 1200 is enabled, the write data may be stored in one of the pinned turbo write buffer TWB-p and the non-pinned turbo write buffer TWB-np.

In an embodiment, data stored in the pinned turbo write buffer TWB-p is not targeted for a move (e.g., a migrate or a flush) to the user storage UST, and data stored in the non-pinned turbo write buffer TWB-np may be targeted for a move to the user storage UST. That is, a priority of data stored in the pinned turbo write buffer TWB-p may be higher than a priority of data stored in the non-pinned turbo write buffer TWB-np. However, the inventive concept is not limited thereto as data stored in the pinned turbo write buffer TWB-p may be targeted for a move to the non-pinned turbo write buffer TWB-np or the user storage UST depending on resources or a policy of a system. In an exemplary embodiment, a migration or flush operation is periodically performed to move data from the turbo write buffer TWB to the user storage UST. In this embodiment, all data present in the non-pinned turbo write buffer TWB-np is first migrated or flushed to the user storage UST before any data of the pinned turbo write buffer TWB-p is migrated or flushed to the user storage UST. In another embodiment, during a given migration, first data in the non-pinned turbo write buffer TWB-np is migrated to the user storage UST during a first period of the migration and second data in the pinned turbo write buffer TWB-p is migrated to the user storage UST during a second period after the first period.

One, in which the write data are to be stored, from among the pinned turbo write buffer TWB-p and the non-pinned turbo write buffer TWB-np may be determined through various schemes (e.g., an internal policy, a change of the internal policy according to a request of a host, and an explicit request of a host).

In an exemplary embodiment of the inventive concept, as described above, the size of the turbo write buffer TWB may be determined under control of the host 1100 or depending on the internal policy of the storage device 1200. In this case, a ratio of the pinned turbo write buffer TWB-p and the non-pinned turbo write buffer TWB-np in the turbo write buffer TWB may be determined or varied through various schemes (e.g., an internal policy, a change of the internal policy according to a request of a host, and an explicit request of a host).

In an exemplary embodiment of the inventive concept, user data may be flushed, migrated, or moved between the pinned turbo write buffer TWB-p, the non-pinned turbo write buffer TWB-np, and the user storage UST. For example, the user data may migrate or move between the pinned turbo write buffer TWB-p and the non-pinned turbo write buffer TWB-np depending on an explicit request of the host 1100, an internal policy of the storage device 1200, or a change of the internal policy according to a request of the host 1100.

Alternatively, the user data may migrate or move between the non-pinned turbo write buffer TWB-np and the user storage UST depending on the explicit request of the host 1100, the internal policy of the storage device 1200, or the change of the internal policy according to the request of the host 1100. For example, the user data may be flushed from the non-pinned turbo write buffer TWB-np to the user storage UST. Alternatively, the user data may migrate or move between the pinned turbo write buffer TWB-p and the user storage UST depending on the explicit request of the host 1100, the internal policy of the storage device 1200, or the change of the internal policy according to the request of the host 1100.

In an exemplary embodiment of the inventive concept, as described with reference to FIG. 7, the storage device 1200 may perform a flush operation during the idle state or the hibernation state. In this case, the storage device 1200 may perform the flush operation on the non-pinned turbo write buffer TWB-np of the turbo write buffer TWB. In other words, the storage device 1200 may flush the user data stored in the non-pinned turbo write buffer TWB-np of the turbo write buffer TWB to the user storage UST.

In this case, the user data written in the pinned turbo write buffer TWB-p may not be flushed to the user storage UST. In other words, even though the storage device 1200 performs the flush operation, the user data written in the pinned turbo write buffer TWB-p may be maintained.

As another example, depending on the internal policy of the storage device 1200, data to be stored in the non-pinned turbo write buffer TWB-np may be written in the pinned turbo write buffer TWB-p. This data may be flushed from the pinned turbo write buffer TWB-p to the user storage UST. In other words, data stored in the pinned turbo write buffer TWB-p may not be flushed by an explicit flush request from the host 1100, but may be selectively flushed to the user storage UST depending on the internal flush policy of the storage device 1200.

In an exemplary embodiment of the inventive concept, in the case where data are flushed, migrated, or moved between the pinned turbo write buffer TWB-p, the non-pinned turbo write buffer TWB-np, and the user storage UST, the controller 1210 may be configured to update a mapping relationship of the moved data. For example, in the case where data corresponding to a first logical block address is flushed or migrated from the pinned turbo write buffer TWB-p to the user storage UST, the controller 1210 may release a mapping relationship of the first logical block address and a physical address of the pinned turbo write buffer TWB-p and may update a mapping relationship of the first logical block address and a physical address of the user storage UST. The release or update of the mapping relationship may be made in a scheme similar to that described above for moving between other areas, and thus, additional description will be omitted to avoid redundancy.

Below, to explain the inventive concept more clearly, a description will be given under the assumption that data to be stored in the pinned turbo write buffer TWB-p is required to be stored in the pinned turbo write buffer TWB-p. However, the inventive concept is not limited thereto.

Accordingly, in the case where the host 1100 issues a read command for first user data written in the pinned turbo write buffer TWB-p, the first user data may be read from the pinned turbo write buffer TWB-p. In this case, it may be possible to read the first user data at a high speed.

For example, as described above, the pinned turbo write buffer TWB-p may store user data based on the SLC scheme, and the user storage UST may store user data in the TLC scheme. A time taken to read user data stored based on the SLC scheme is shorter than a time taken to read user data stored based on the TLC scheme.

In other words, as particular user data are retained in the pinned turbo write buffer TWB-p, a speed at which the particular user data are read may be improved. This function of the storage device 1200 may be called "turbo read".

In an exemplary embodiment of the inventive concept, the physical storage space PS of the storage device 1200 may indicate a storage space of the nonvolatile memory device 1220. In other words, the nonvolatile memory device 1220 may include the pinned turbo write buffer TWB-p, the non-pinned turbo write buffer TWB-np, or the user storage UST.

Figure 9:
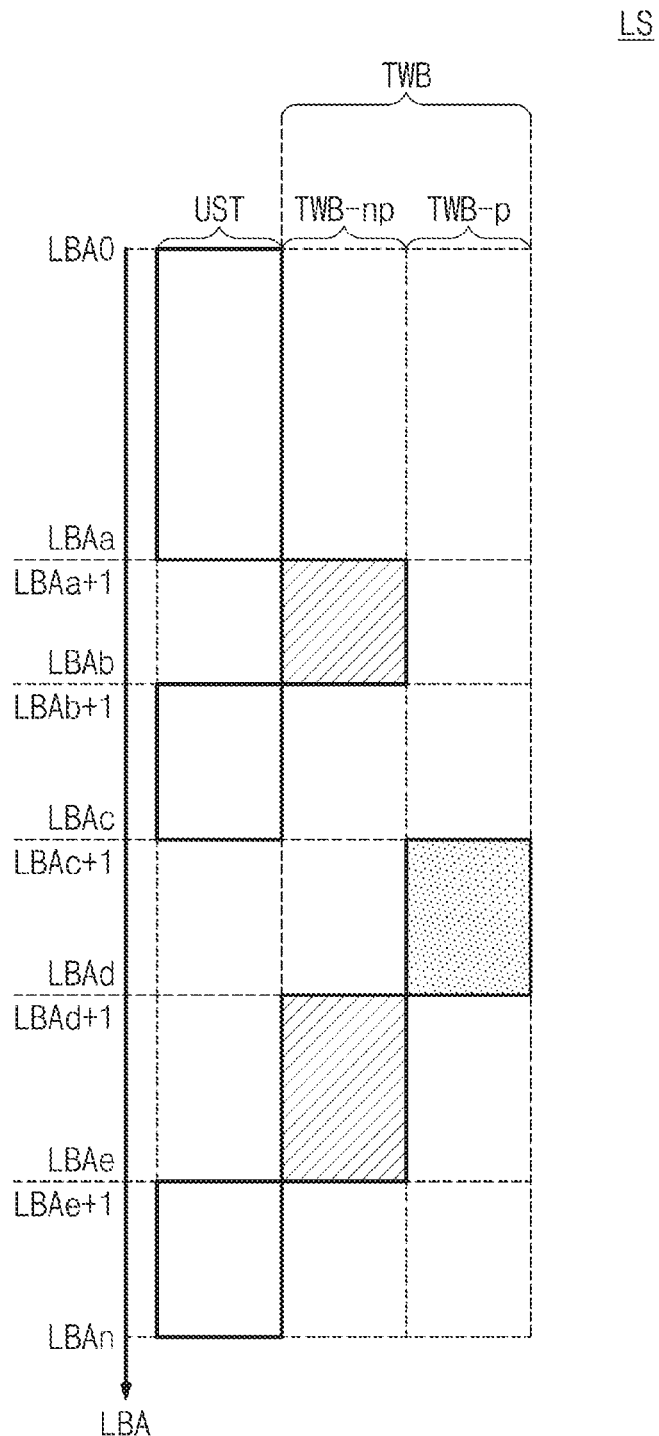
FIG. 9 is a diagram illustrating a logical storage space for a physical storage space of a storage device described with reference to FIG. 8.

FIG. 9 is a diagram illustrating a logical storage space for the physical storage space PS of the storage device 1200 described with reference to FIG. 8. For convenience of description, the embodiment of FIG. 9 will be described with reference to one logical unit. However, the inventive concept may be identically applied to two or more logical units to which the turbo write buffers TWB correspond, or a relationship between logical units and a shared turbo write buffer (e.g., TWB0).

Referring to FIGS. 1 and 9, a logical storage space LS of the storage device 1200 that is identified by the host 1100 may include the user storage UST and the turbo write buffer TWB. The turbo write buffer TWB may include the pinned turbo write buffer TWB-p and the non-pinned turbo write buffer TWB-np.

A first logical block address range (e.g., LBA0 to LBAa, LBAb+1 to LBAc, and LBAe+1 to LBAn) may correspond to a logical storage space of the user storage UST. In this case, user data stored in the first logical block address range (e.g., LBA0 to LBAa, LBAb+1 to LBAc, and LBAe+1 to LBAn) may be stored in a physical storage space of the user storage UST.

A second logical block address range (e.g., LBAa+1 to LBAb and LBAd+1 to LBAe) may correspond to a logical storage space of the non-pinned turbo write buffer TWB-np. In this case, user data stored in the second logical block address range (e.g., LBAa+1 to LBAb and LBAd+1 to LBAe) may be stored in a physical storage space of the non-pinned turbo write buffer TWB-np.

A third logical block address range (e.g., LBAc+1 to LBAd) may correspond to a logical storage space of the pinned turbo write buffer TWB-p. In this case, user data stored in the third logical block address range (e.g., LBAc+1 to LBAd) may be stored in a physical storage space of the pinned turbo write buffer TWB-p.

As described above, the user storage UST, the non-pinned turbo write buffer TWB-np, and the pinned turbo write buffer TWB-p may be distributed in various forms on the logical storage space LS recognized by the host 1100. However, the inventive concept is not limited thereto and the third logical block address range may correspond to a logical storage space of the non-pinned turbo write buffer TWB-np and the second logical block address range may correspond to a logical storage space of the pinned turbo write buffer TWB-p. In an exemplary embodiment of the inventive concept, user data may be moved/flushed/migrated between the user storage UST, the non-pinned turbo write buffer TWB-np, and the pinned turbo write buffer TWB-p, depending on the explicit request of the host 1100 or the internal policy of the storage device 1200.

For example, the host 1100 may specify one of the pinned turbo write buffer TWB-p and the non-pinned turbo write buffer TWB-np in the turbo write. As another example, the host 1100 may specify one of the pinned turbo write buffer TWB-p and the non-pinned turbo write buffer TWB-np as a turbo write target before the turbo write. As yet another example, the host 1100 may not specify the pinned turbo write buffer TWB-p or the non-pinned turbo write buffer TWB-np in the turbo write.

The host 1100 may check a distribution state of data changed by the storage device 1200 by requesting (e.g., using the Query UPIU) information of the pinned turbo write buffer TWB-p and the non-pinned turbo write buffer TWB-np from the storage device 1200 periodically or if necessary.

Figure 10A:
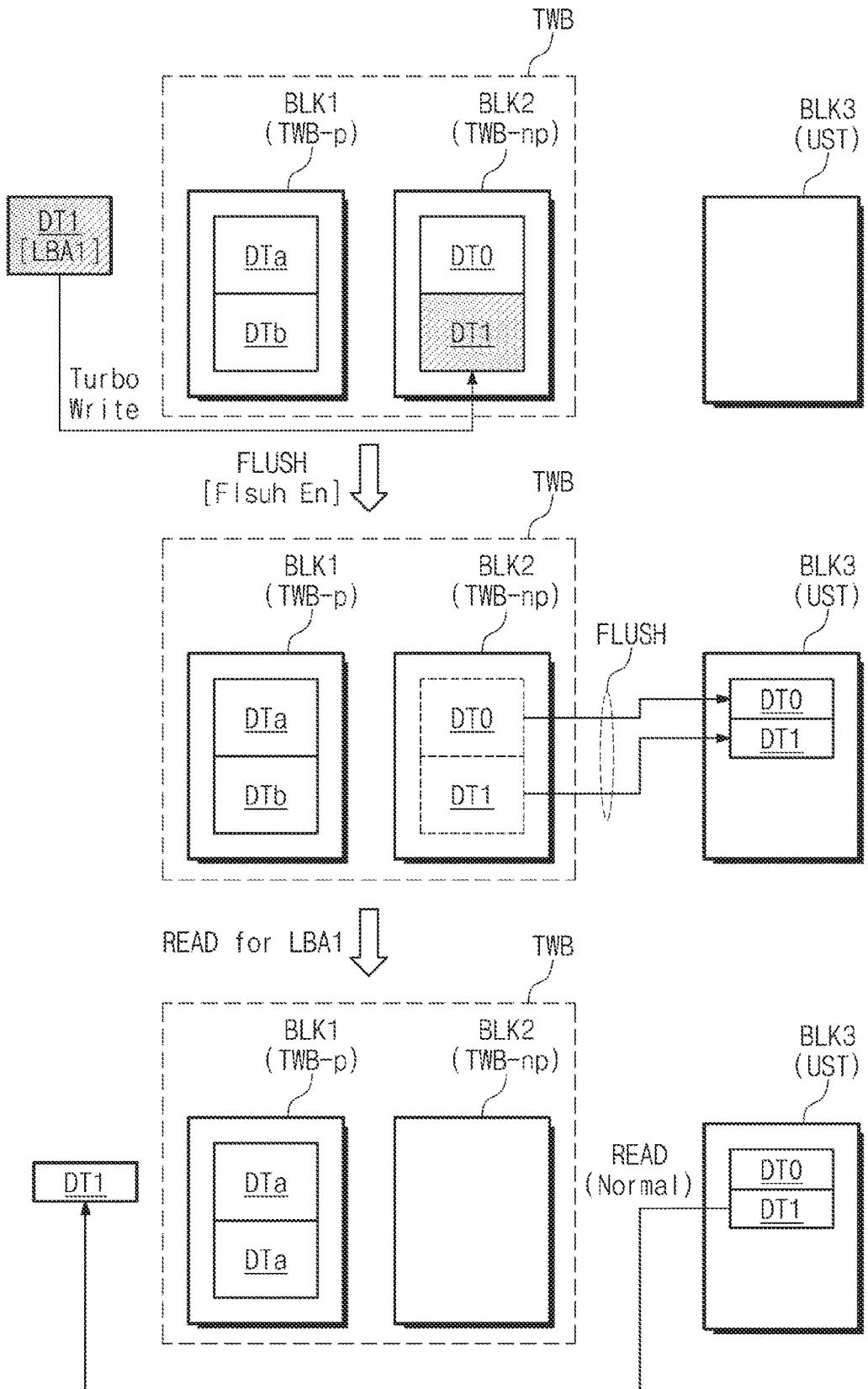
FIGS. 10A and 10B are diagrams illustrating an operation in a physical storage space of a storage device described with reference to FIG. 8 according to an exemplary embodiment of the inventive concept.
Figure 10B:
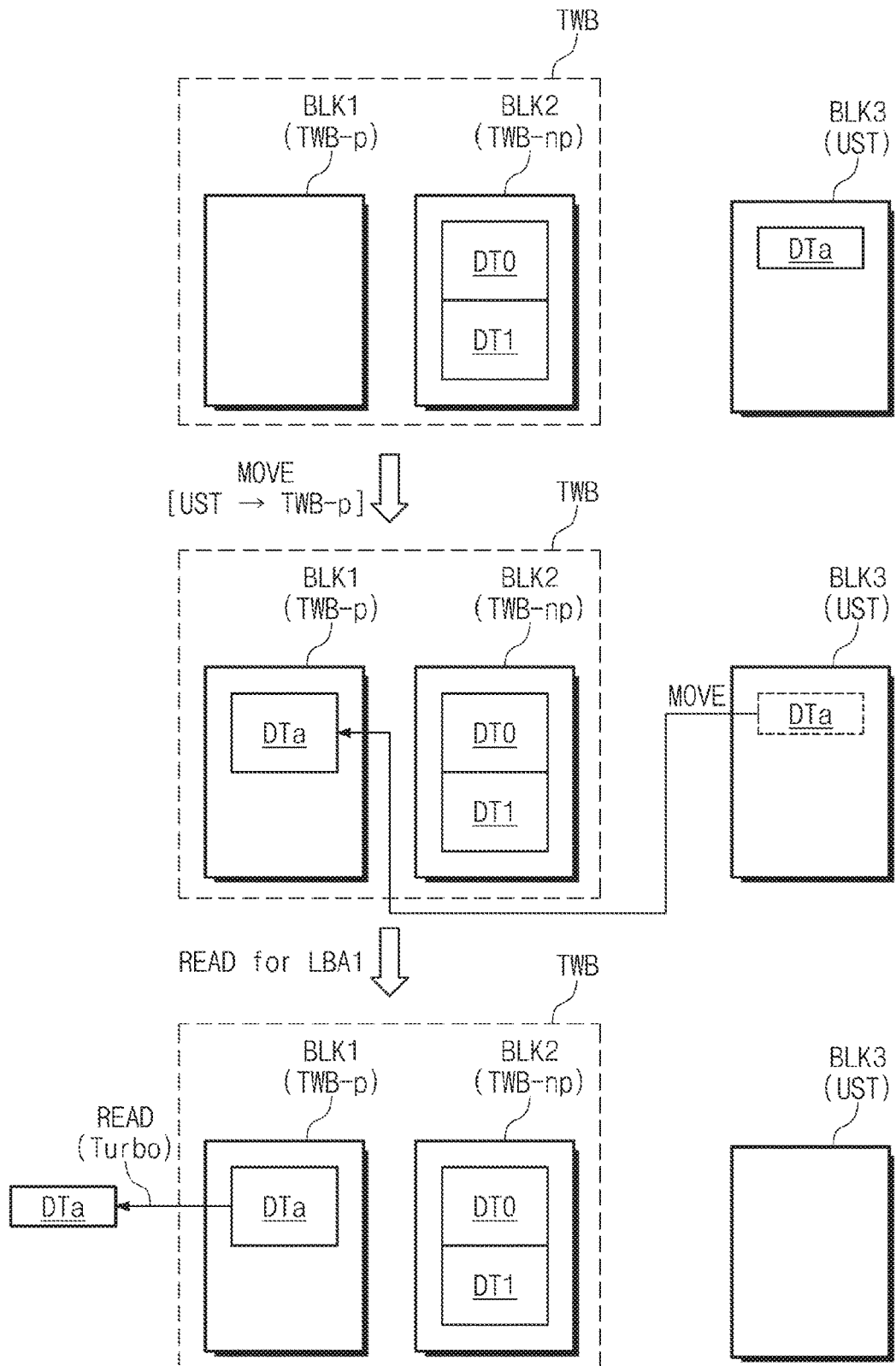

FIGS. 10A and 10B are diagrams illustrating an operation in a physical storage space of a storage device described with reference to FIG. 8. For brevity of illustration and convenience of description, it is assumed that the pinned turbo write buffer TWB-p includes a first memory block BLK1, the non-pinned turbo write buffer TWB-np includes a second memory block BLK2, and the user storage UST may include a third memory block BLK3. However, the inventive concept is not limited thereto.

Referring to FIGS. 1, 8, and 10A, the storage device 1200 may receive first data DT1 corresponding to a first logical block address LBA1 from the host 1100. In an exemplary embodiment of the inventive concept, the turbo write function of the storage device 1200 may be in an enabled state. In this case, the storage device 1200 may write the received first data DT1 in the turbo write buffer TWB (e.g., the non-pinned turbo write buffer TWB-np).

In other words, the storage device 1200 may perform the turbo write on the first data DT1. In an exemplary embodiment of the inventive concept, in the case where the turbo write function is enabled, whether to store data in any one of the pinned turbo write buffer TWB-p and the non-pinned turbo write buffer TWB-np may be determined through various schemes.

In an exemplary embodiment of the inventive concept, as illustrated in FIG. 10A, the pinned turbo write buffer TWB-p and the non-pinned turbo write buffer TWB-np may be full of user data DTa, DTb, DT0, and DT1. In this case, the storage device 1200 may notify the host 1100 that a flush operation is required, by setting a particular bit (e.g., bit[5]) of an exception event status field (e.g., "wExceptionEventStatus") of the attributes.

The host 1100 may check the exception event status field of the attributes through a query request and may check that the flush operation is required at the storage device 1200. The host 1100 may allow the flush operation of the storage device 1200 by setting the turbo write buffer flush enable field or the turbo write buffer flush enable field during hibernation of the flag of the storage device 1200 as described with reference to FIG. 7.

When the flush function is allowed (or enabled) under control of the host 1100, the storage device 1200 may perform the flush operation. For example, in the idle state or the hibernation state, the storage device 1200 may flush the user data DT0 and DT1 stored in the non-pinned turbo write buffer TWB-np to the third memory block BLK3 of the user storage UST. In an exemplary embodiment of the inventive concept, even though the flush operation is allowed under control of the host 1100, the user data DTa and DTb stored in the pinned turbo write buffer TWB-p may not be flushed to the user storage UST. In other words, the user data DTa and DTb stored in the pinned turbo write buffer TWB-p remains while the user data DT0 and DT1 stored in the non-pinned turbo write buffer TWB-np is flushed.

Afterwards, the storage device 1200 may receive a read command for the first logical address LBA1 from the host 1100. In this case, the storage device 1200 may read the first data DT1 stored in the third memory block BLK3 of the user storage UST and may output the read first data DT1 to the host 1100.

In an exemplary embodiment of the inventive concept, because the first data DT1 are written (e.g., SLC programmed) in the non-pinned turbo write buffer TWB-np but the first data DT1 are flushed to the user storage UST due to the flush operation, the first data DT1 may be read through a normal read operation (e.g., a TLC read operation). In other words, the first data DT1 may be SLC programmed but TLC read.

Referring to FIGS. 1, 8, and 10B, the 0-th and first data DT0 and DT1 may be stored in the second memory block BLK2 of the non-pinned turbo write buffer TWB-np, and the a-th data DTa may be stored in the third memory block BLK3 of the user storage UST.

Afterwards, depending on the explicit request of the host 1100 or the internal policy of the storage device 1200, the a-th data DTa of the user storage space UST may move to the first memory block BLK1 of the pinned turbo write buffer TWB-p. For example, the storage device 1200 may read the a-th data DTa from the third memory block BLK3 of the user storage UST and may store the read a-th data DTa in the first memory block BLK1 of the pinned turbo write buffer TWB-p. Afterwards, the a-th data DTa stored in the third memory block BLK3 of the user storage UST may be invalidated, deleted, or unmapped. In an exemplary embodiment of the inventive concept, even though the a-th data DTa are invalidated, deleted, or unmapped, an a-th logical block address LBAa corresponding to the a-th data DTa may maintain mapping with the first memory block BLK1 of the pinned turbo write buffer TWB-p.

Afterwards, the storage device 1200 may receive a read command for the a-th logical block address LBAa corresponding to the a-th data DTa from the host 1100. In this case, the storage device 1200 may read the a-th data DTa stored in the first memory block BLK1 of the pinned turbo write buffer TWB-p and may transfer the read a-th data DTa to the host 1100.

In an exemplary embodiment of the inventive concept, an operation of reading the a-th data DTa stored in the first memory block BLK1 of the pinned turbo write buffer TWB-p may be faster than an operation of reading data stored in the third memory block BLK3 of the user storage UST. In other words, the storage device 1200 according to an exemplary embodiment of the inventive concept may support a fast read operation (e.g., a turbo read operation) with regard to particular data, by storing and retaining the particular data in the turbo write buffer TWB (or the pinned turbo write buffer TWB-p).

In an exemplary embodiment of the inventive concept, the storage device 1200 may inform the host 1100 of the remaining (or free) capacity of the turbo write buffer TWB in response to a request of the host 1100. The storage device 1200 may write information about the remaining free capacity of the turbo write buffer TWB to an available turbo write buffer size field (e.g., "dAvailableTurboWriteBufferSize") of the attributes. The host 1100 may obtain capacity information of the turbo write buffer TWB by reading the available turbo write buffer size field (e.g., by using the Query UPIU).

For example, the storage device 1200 may separately record the remaining capacity of the pinned turbo write buffer TWB-p and the remaining capacity of the non-pinned turbo write buffer TWB-np at the available turbo write buffer size field. As another example, the storage device 1200 may record a total of the remaining capacity of the turbo write buffer TWB at the available turbo write buffer size field. Whether the storage device 1200 records the remaining capacity of the turbo write buffer TWB integrally or individually may be specified through flag setting of the host 1100.

For example, the storage device 1200 may record a smaller capacity than an actual free capacity of the turbo write buffer TWB at the available turbo write buffer size field. In the nonvolatile memory device 1220 such as a flash memory, in the case where a time between consecutive erase operations is smaller than a threshold time, the reliability of data may decrease.

Because the capacity of the turbo write buffer TWB is smaller than the capacity of the user storage UST and the turbo write buffer TWB is used in the SLC scheme, the turbo write buffer TWB may be filled with data more quickly than the user storage UST. In addition, in the case where the host 1100 prefers the turbo write of a high speed, the turbo write buffer TWB may be full of data more quickly.

In the case where data are intensively written in the turbo write buffer TWB, during a short time window, there are performed the following series of operations: a first erase operation is performed on the turbo write buffer TWB, data are written in the turbo write buffer TWB, the data of the turbo write buffer TWB are flushed, a second erase operation is performed on the turbo write buffer TWB, and data are written in the turbo write buffer TWB.

In this case, when a time between the first erase operation and the second erase operation is smaller than the threshold time, the reliability of data that are written in the turbo write buffer TWB after the second erase operation may decrease. To increase reliability, even though a particular memory block of the turbo write buffer TWB does not store valid data and is reusable after an erase operation, when a time passing after a previous erase operation of the particular memory block is smaller than the threshold time, the storage device 1200 may record a capacity, from which a capacity of the particular memory block is excluded, at the available turbo write buffer size field.

Figure 11:
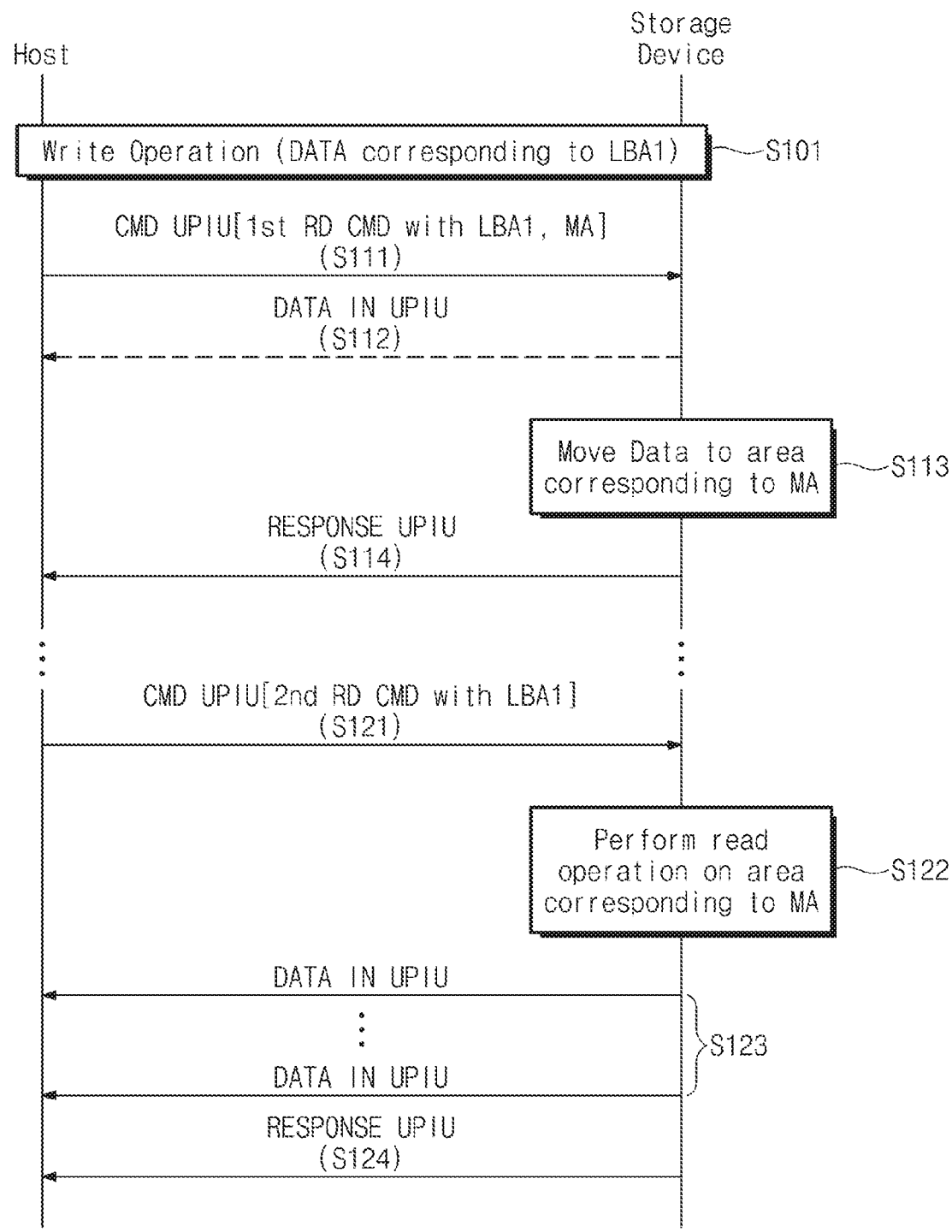
FIG. 11 is a flowchart illustrating an operation of a storage system of FIG. 1 according to an exemplary embodiment of the inventive concept.

FIG. 11 is a flowchart illustrating an operation of a storage system of FIG. 1 according to an exemplary embodiment. In an exemplary embodiment, how to move data between the pinned turbo write buffer TWB-p, the non-pinned turbo write buffer TWB-np, and the user storage UST will be described with reference to FIG. 11. The storage system 1000 according to an exemplary embodiment of the inventive concept performs the data move between the pinned turbo write buffer TWB-p, the non-pinned turbo write buffer TWB-np, and the user storage UST by using a read command (or various other commands).

For example, the storage system 1000 may require a fast read (i.e., a turbo read operation) with regard to particular data under a particular condition. For example, in the case where the particular data is present in the user storage UST, a read operation for the particular data may be slow. In this case, the storage system 1000 may move the particular data stored in the user storage UST to the pinned turbo write buffer TWB-p or the non-pinned turbo write buffer TWB-np. Alternatively, the storage system 1000 may support a data move between the pinned turbo write buffer TWB-p and the non-pinned turbo write buffer TWB-np, a data move between the user storage UST and the non-pinned turbo write buffer TWB-np, and a data move between the pinned turbo write buffer TWB-p and the user storage UST. A data move scheme will be more fully described below with reference to certain drawings.

Referring to FIGS. 1, 8, and 11, in operation S101, the host 1100 and the storage device 1200 perform a write operation. For example, as described with reference to FIG. 6, the host 1100 and the storage device 1200 may exchange various UPIUs (e.g., CMD UPIU, RTT UPIU, DATA OUT UPIU, RESPONSE UPIU) for the write operation. In an exemplary embodiment, data "DATA" to be written in the storage device 1200 in operation S101 corresponds to a first logical block address LBA1. In an exemplary embodiment, the data "DATA" to be written in operation S101 is written in one of the pinned turbo write buffer TWB-p, the non-pinned turbo write buffer TWB-np, and the user storage UST depending on various schemes as described above.

In operation S111, the host 1100 transfers the CMD UPIU corresponding to a first read command 1st RD CMD including the first logical block address LBA1 and move attribute information MA to the storage device 1200. For example, the host 1100 may change a storage location (e.g., the pinned turbo write buffer TWB-p, the non-pinned turbo write buffer TWB-np, or the user storage UST) of data corresponding to the first logical block address LBA1. To this end, the host 1100 may transfer the CMD UPIU corresponding to the first read command 1st RD CMD including the move attribute information MA and the first logical block address LBA1 to the storage device 1200. In an exemplary embodiment, the move attribute information MA includes information about a target area (e.g., one of the pinned turbo write buffer TWB-p, the non-pinned turbo write buffer TWB-np, or the user storage UST) to which particular data is to be moved. In an exemplary embodiment, the move attribute information MA is stored in a particular field of the CMD UPIU of the first read command 1st RD CMD.

In operation S112, in response to the received CMD UPIU (i.e., the first read command 1st RD CMD), the storage device 1200 reads data corresponding to the first logical block address LBA1 and transfers the read data to the host 1100 through the DATA IN UPIU. For example, it is assumed that the data corresponding to the first logical block address LBA1 is present in the user storage UST. In this case, the storage device 1200 reads the data corresponding to the first logical block address LBA1 from the user storage UST and transfers the read data to the host 1100 through the DATA IN UPIU.

In operation S113, the storage device 1200 moves the data corresponding to the first logical block address LBA1 to an area corresponding to the move attribute information MA. For example, it is assumed that the data corresponding to the first logical block address LBA1 is present in the user storage UST and the move attribute information MA includes information identifying the pinned turbo write buffer TWB-p. In this case, the storage device 1200 moves the data stored in the user storage UST to the pinned turbo write buffer TWB-p. However, the inventive concept is not limited thereto. For example, the data move may be made between the pinned turbo write buffer TWB-p, the non-pinned turbo write buffer TWB-np, and the user storage UST depending on an area in which the data corresponding to the first logical block address LBA1 is present and the area corresponding to the move attribute information MA. For example, the storage device 1200 may move the data stored in the user storage UST to the non-pinned turbo write buffer TWB-np when the move attribute information MA includes information identifying the non-pinned turbo write buffer TWB-np.

In operation S114, the storage device 1200 transfers the RESPONSE UPIU to the host 1100 in response to the CMD UPIU received in operation S111. The host 1100 may recognize that an operation (e.g., a read operation or a data move operation) corresponding to the CMD UPIU transferred in operation S111 has completed, based on the received RESPONSE UPIU. For example, the RESPONSE UPIU could indicate that the read operation completed, that the read operation and the data move operation completed, or that the read operation completed and the move operation failed.

In an exemplary embodiment, operation S112 in which the read data is transferred through the DATA IN UPIU is omitted. For example, in the case where a value of a particular field (e.g., a data transfer length field) of the CMD UPIU in operation S111 is set to a particular value (e.g., "0"), a read data transfer operation corresponding to operation S112 is omitted. For this reason, operation S112 is marked by a dotted line in FIG. 11. For example, even though the storage device 1200 receives a read command from the host 1100 associated with a logical block address, the storage device 1200 reads the data from a source area associated with the logical address without transferring the read data to the host 1100 and moves the read data to a destination area (e.g., to a turbo write buffer), when a field of the read command indicates not to transfer the data and includes the move attribute information MA.

Afterwards, in operation S121, the host 1100 may transfer the CMD UPIU corresponding to a second read command 2nd RD CMD for reading the data corresponding to the first logical block address LBA1 to the storage device 1200. The sending of the second read command 2nd RD CMD may be omitted when the data is transferred to the host 1100 during operation S112. Further, even though the data is transferred during operation S112, operation S121 may be performed if the host 1100 needs this data again a second time.

In operation S122, the storage device 1200 performs a read operation on the area corresponding to the move attribute information MA. For example, it is assumed that the data corresponding to the first logical block address LBA1 is stored in the user storage UST in the write operation corresponding to operation S101 and the data corresponding to the first logical block address LBA1 moves to the pinned turbo write buffer TWB-p through operation S111 and operation S113. In this case, in the write operation between the host 1100 and the storage device 1200, even though the data corresponding to the first logical block address LBA1 is stored in the user storage UST, afterwards, the data corresponding to the first logical block address LBA1 may be moved to the pinned turbo write buffer TWB-p depending on a request of the host 1100 (e.g., the first read command 1st RD CMD including the move attribute information MA). As such, afterwards, in the case where the second read command 2nd RD CMD associated with the first logical block address LBA1 is received, the storage device 1200 reads the data corresponding to the first logical block address LBA1 by performing the read operation on the area to which the data corresponding to the first logical block address LBA1 is moved (i.e., an area corresponding to a previous move attribute information). In this case, because the data corresponding to the first logical block address LBA1 is read from the pinned turbo write buffer TWB-p, a high-speed operation (i.e., a turbo read operation) is possible.

Afterwards, in operation S123, the storage device 1200 transfers the read data to the host 1100 through the DATA IN UPIU. After all the read data is transferred through operation S123, the storage device 1200 transfers a RESPONSE UPIU to the host 1100. The response UPIU may indicate that transfer of the read data has completed.

As described above, the host 1100 of the storage system 1000 according to an exemplary embodiment of the inventive concept includes the move attribute information MA in the read command RD CMD or the CMD UPIU including the read command RD CMD. The storage device 1200 may perform the data move between respective areas in response to the read command RD CMD or the CMD UPIU including the read command RD CMD. That is, the storage system 1000 according to an exemplary embodiment of the inventive concept supports a data move between respective areas without using an additional command.

Figure 12A:
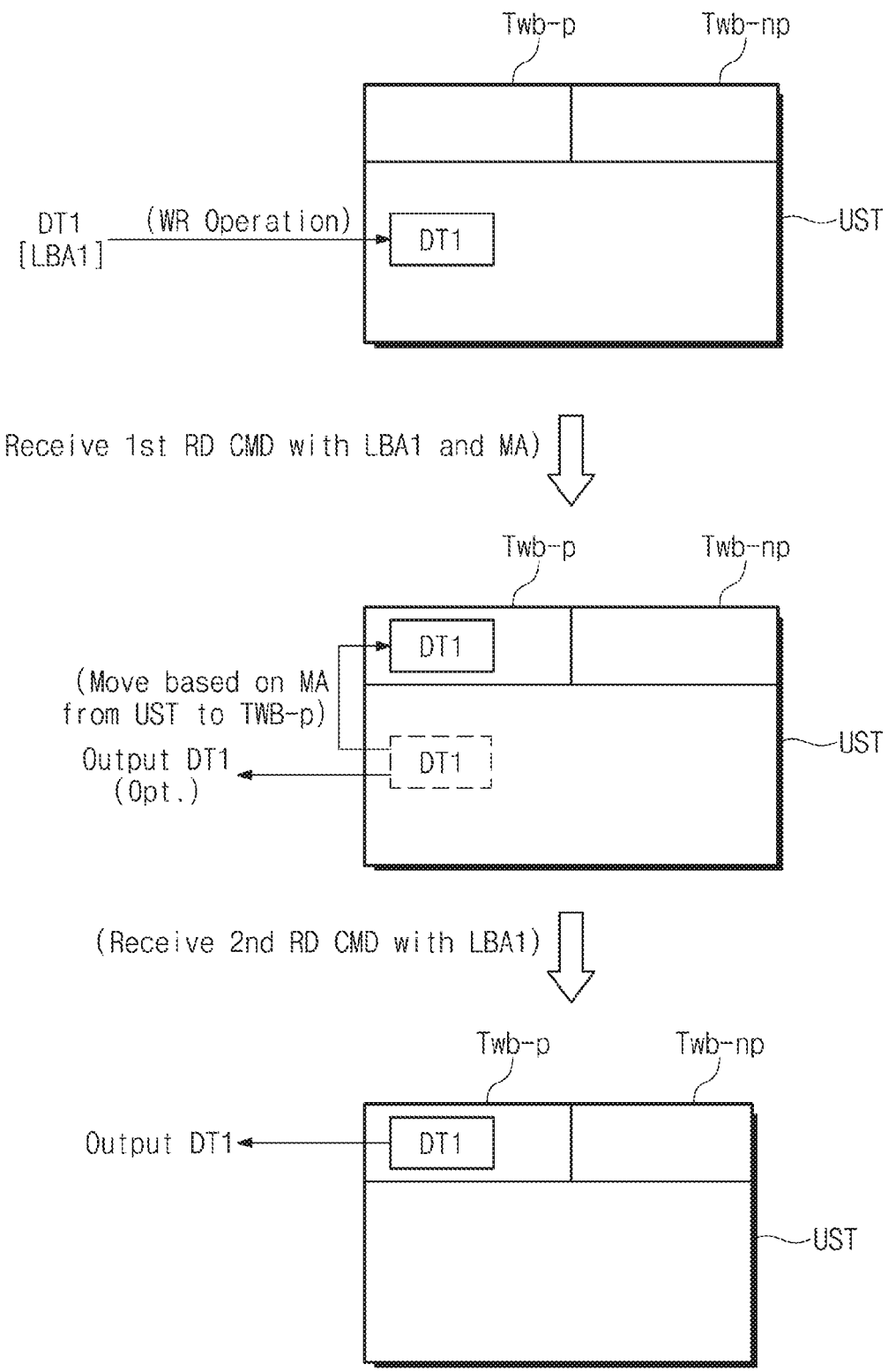
FIGS. 12A and 12B are diagrams for describing an operation according to the flowchart of FIG. 11.
Figure 12B:
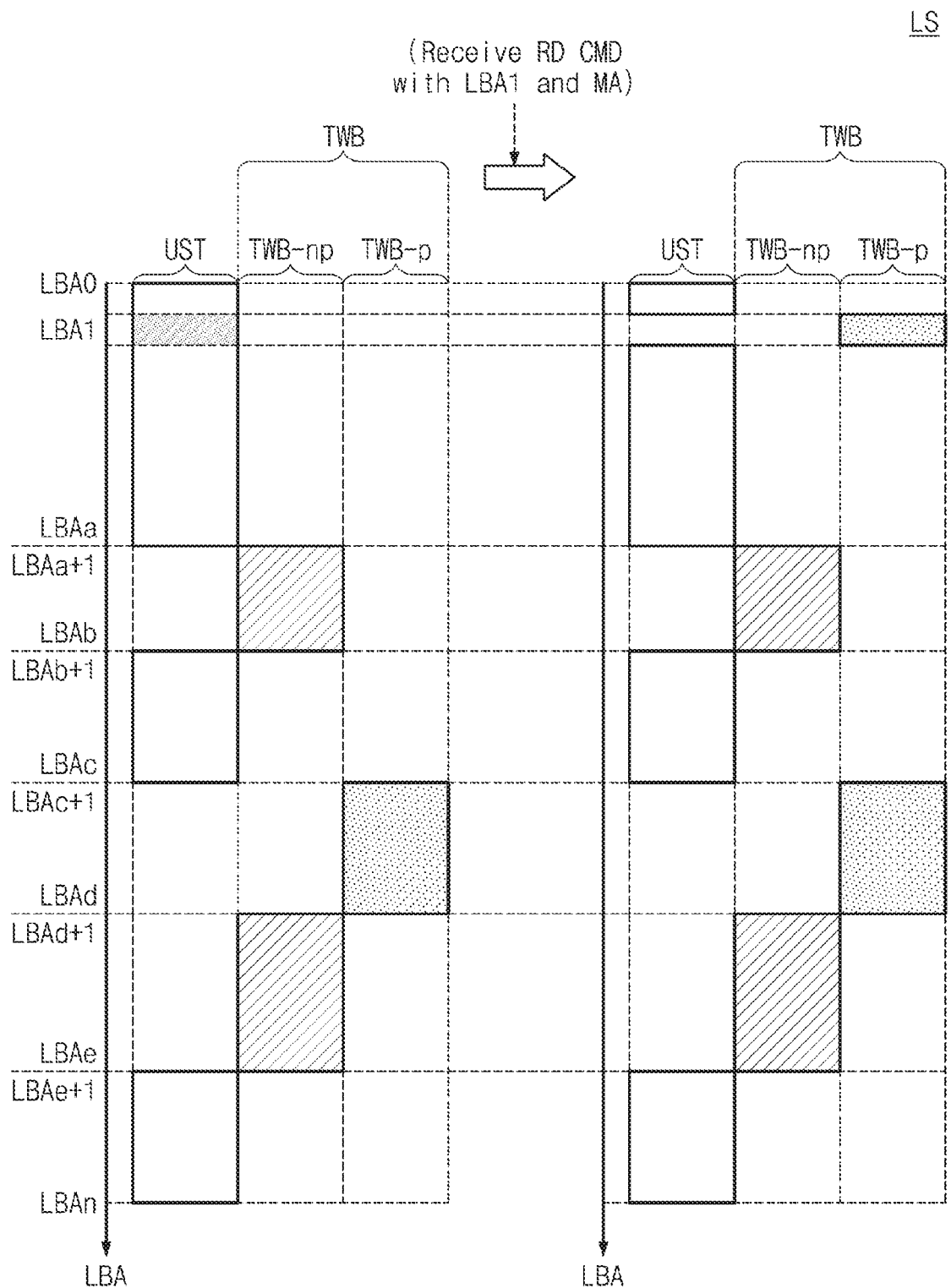

FIGS. 12A and 12B are diagrams for describing an operation according to the flowchart of FIG. 11. FIG. 12A is a diagram for describing the data move on the basis of a physical storage space, and FIG. 12B is a diagram for describing the data move on the basis of a logical storage space. Various reference signs illustrated in FIGS. 12A and 12B are similar to the same reference signs described above, and thus, additional description will be omitted to avoid redundancy.

Referring to FIGS. 1, 8, 12A, and 12B, depending on a request from the host 1100, the storage device 1200 may perform a write operation using first data DT1. The first data DT1 may correspond to a first logical block address LBA1. For convenience of description, it is assumed that the storage device 1200 writes the first data DT1 in the user storage UST. However, the inventive concept is not limited thereto. For example, in the case where the storage device 1200 performs the turbo write operation, the first data DT1 may be written in the pinned turbo write buffer TWB-p or the non-pinned turbo write buffer TWB-np.

Afterwards, the storage device 1200 receives the first read command 1st RD CMD including the first logical block address LBA1 and the move attribute information MA from the host 1100. In an exemplary embodiment, the first read command 1st RD CMD is received in the form of the CMD UPIU. The storage device 1200 performs a data read operation and a data move operation in response to the first read command 1st RD CMD including the move attribute information MA. For example, the storage device 1200 may read the first data DT1 corresponding to the first logical block address LBA1 included in the first read command 1st RD CMD from the user storage UST and transfer the read first data DT1 to the host 1100. In an exemplary embodiment, the operation of transferring the first data DT1 to the host 1100 is omitted depending on a particular field value of the first read command 1st RD CMD.

Afterwards, the storage device 1200 moves the read first data DT1 from the user storage UST to the pinned turbo write buffer TWB-p corresponding to the move attribute information MA. In this case, a physical or logical storage area of the first data DT1 may be changed (i.e., may be changed from the user storage UST to the pinned turbo write buffer TWB-p), but the first logical block address LBA1 corresponding to the first data DT1 is maintained without modification. For example, as illustrated in FIG. 12B, before the data move, the first data DT1 corresponding to the first logical block address LBA1 is managed as being stored in the user storage UST; and after the data move, the first data DT1 corresponding to the first logical block address LBA1 is managed as being stored in the pinned turbo write buffer TWB-p. In this case, a logical block address of the first data DT1 is identical to the first logical block address LBA1. For example, a mapping of the first logical block address LBA1 to a first physical address of the first data DT1 in the user storage UST in a mapping table may be changed to a mapping of the first logical block address LBA1 to a second physical address of the first data in the pinned turbo write buffer TWB-p. After the move, the first data DT1 stored in the user storage UST may be invalidated or marked as invalid. For example, the move may create a new mapping in a mapping table of the pinned turbo write buffer TWB-p that maps the first logical block address LBA1 to the second physical address and invalidates the previous mapping in a mapping table of the user storage UST that maps the first logical address to the first physical address.

Afterwards, the storage device 1200 receives the second read command 2nd RD CMD including the first logical block address LBA1 from the host 1100. The second read command 2nd RD CMD may be received in the form of the CMD UPIU. Because the first data DT1 corresponding to the first logical block address LBA1 was moved to the pinned turbo write buffer TWB-p, the storage device 1200 reads the first data DT1 corresponding to the first logical block address LBA1 from the pinned turbo write buffer TWB-p and transfers the read first data DT1 to the host 1100.

As described above, the storage system 1000 according to an exemplary embodiment of the inventive concept may write data in various areas (e.g., the pinned turbo write buffer TWB-p, the non-pinned turbo write buffer TWB-np, and the user storage UST) depending on various policies or various schemes.

Figure 13:
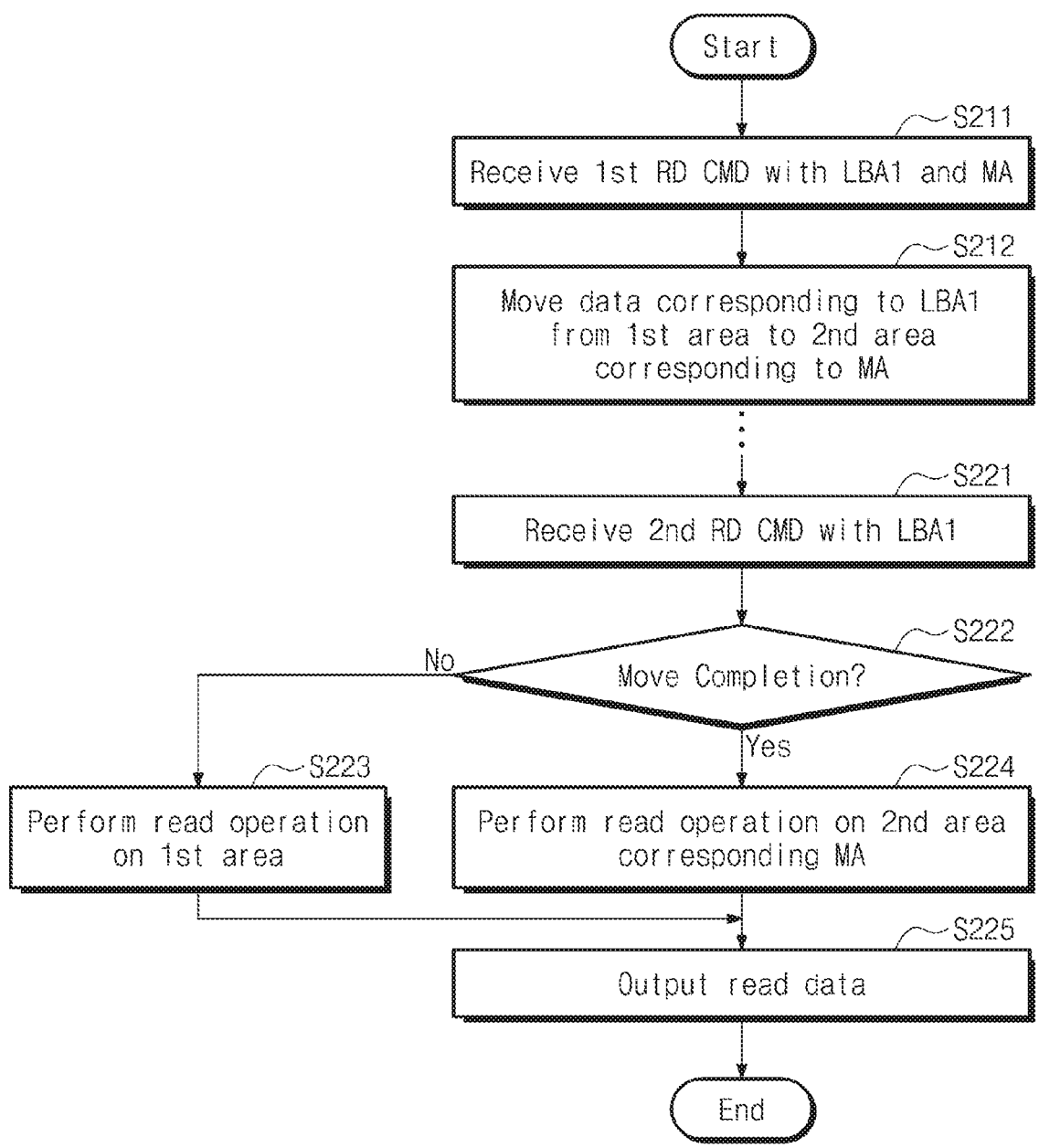
FIG. 13 is a flowchart illustrating an operation of a storage device of FIG. 1 according to an exemplary embodiment of the inventive concept.

FIG. 13 is a flowchart illustrating an operation of a storage device of FIG. 1 according to an exemplary embodiment of the inventive concept. Referring to FIGS. 1, 8, and 13, in operation S211, the storage device 1200 receives the first read command 1st RD CMD including the first logical block address LBA1 and the move attribute information MA. In operation S212, in response to the first read command 1st RD CMD, the storage device 1200 moves data corresponding to the first logical block address LBA1 from a first area to a second area corresponding to the move attribute information MA. For example, in the case where data corresponding to the first logical block address LBA1 is present in the user storage UST and the move attribute information MA indicates the pinned turbo write buffer TWB-p, the storage device 1200 reads the data corresponding to the first logical block address LBA1 from the user storage UST and moves the read data to the pinned turbo write buffer TWB-p.

Afterwards, in operation S221, the storage device 1200 receives the second read command 2nd RD CMD including the first logical block address LBA1. In operation S222, the storage device 1200 determines whether the data move operation corresponding to operation S212 has completed.

When it is determined that the data move operation has not completed, in operation S223, the storage device 1200 performs a read operation on the first area. When it is determined that the data move operation has completed, in operation S224, the storage device 1200 performs a read operation on the second area corresponding to the move attribute information MA For example, as described above, it is assumed that the data corresponding to the first logical block address LBA1 is present in the user storage UST and the move attribute information MA indicates the pinned turbo write buffer TWB-p. Under this assumption, when the data move has not completed, the storage device 1200 may read the data corresponding to the first logical block address LBA1 by performing a read operation on the user storage UST. When the data move has completed, the storage device 1200 may read the data corresponding to the first logical block address LBA1 by performing a read operation on the pinned turbo write buffer TWB-p. In an exemplary embodiment, although not illustrated in drawings, in the data move operation, the data corresponding to the first logical block address LBA1 is temporarily stored in a separate buffer memory. In this case, the data corresponding to the first logical block address LBA1 may be provided from the separate buffer memory to the host 1100 without a separate read operation.

In operation S225, the storage device 1200 transfers the read data to the host 1100. For example, the storage device 1200 may transfer the read data to the host 1100 through the DATA IN UPIU; and after the read data are all transferred, the storage device 1200 may transfer the RESPONSE UPIU to the host 1100.

An embodiment in which data corresponding to the first logical block address LBA1 is moved from the user storage UST to the pinned turbo write buffer TWB-p is mainly described above, but the inventive concept is not limited thereto. For example, the storage system 1000 may support a data move between various areas. In this case, information about a target area to which data is to be moved may be determined by the move attribute information MA, and the move attribute information MA may be a particular field of the CMD UPIU forming the read command RD CMD. In an exemplary embodiment, the data move between respective areas may be performed without outputting data to the host 1100, by setting a value of another particular field of the CMD UPIU forming the read command RD CMD to a particular value.

FIGS. 14A to 14D are diagrams illustrating various formats of a data packet exchanged between a host and a storage device of FIG. 1. As described above, the host 1100 and the storage device 1200 may communicate with each other based on a universal flash storage (UFS) interface defined by the JEDEC standard. The UFS interface defines various data packets.

In an exemplary embodiment, data structures discussed below may be similar to a data structure defined in the UFS interface of the JEDEC standard. To make embodiments of the inventive concept clear, additional description will be omitted with regard to components or fields that are unnecessary to describe an embodiment of the inventive concept. However, even though the fields are not described, one of ordinary skill in the art may implement the technical idea of the inventive concept based on embodiments of the inventive concept disclosed in the detailed description.

For example, the CMD UPIU defined by the UFS interface may have the packet format illustrated in FIG. 14A. For example, the CMD UPIU may include the following fields: Trans Type, Flags, Logical Unit Number (LUN), Task Tag, Initiation Device Identifier/Command Set Type (IID/CST), Error History Source (EHS) Length, Data Segment Length, Expected Data Transfer Length, Command Descriptor Block (CDB), Header, Reserved, etc.

The host 1100 of the storage system 1000 according to an exemplary embodiment of the inventive concept may provide the CMD UPIU illustrated in FIG. 14A to the storage device 1200. In this case, the host 1100 may set the move attribute information MA in a particular field of the various fields of the CMD UPIU. For example, the host 1100 may set the move attribute information MA in the "Flags" field of the CMD UPIU. That is, data corresponding to a logical block address included in the command descriptor block CDB of the CMD UPIU may be moved to the user storage UST when a value of the "Flags" field of the CMD UPIU is a first value, may be moved to the pinned turbo write buffer TWB-p when a value of the "Flags" field of the CMD UPIU is a second value, and may be moved to the non-pinned turbo write buffer TWB-np when a value of the "Flags" field of the CMD UPIU is a third value. In other words, the host 1100 may set the move attribute information MA about a target area to which particular data is to be moved, in the "Flags" field of the CMD UPIU. For example, the move attribute information MA may be located in the "Flag" field of the CMD UPIU.

In an exemplary embodiment, a particular field of the CMD UPIU is set to a particular value for the purpose of moving data in the storage device 1200 without a data transfer between the host 1100 and the storage device 1200. For example, an "Expected Data Transfer Length" field of the CMD UPIU is a field indicating a length of data that is exchanged between the host 1100 and the storage device 1200. The host 1100 may set a value of the "Expected Data Transfer Length" field of the CMD UPIU to a particular value (e.g., "0"). In this case, the storage device 1200 only performs a data move based on the move attribute information MA set at the "Flags" field without a data transfer to the host 1100. For example, if even though the command descriptor block CDB indicates a read command is to be performed to read data, the read data is not transferred to the host 1100 when the "Expected Data Transfer Length" is 0.

The host 1100 according to an exemplary embodiment of the inventive concept sets the move attribute information MA in a particular field of the command descriptor block CDB included in the CMD UPIU or sets a value for preventing a data transfer in the particular field. For example, FIGS. 14B to 14D illustrate various command descriptor blocks CDB1 to CDB3 that are able to be included in the CMD UPIU.

Figure 14B:
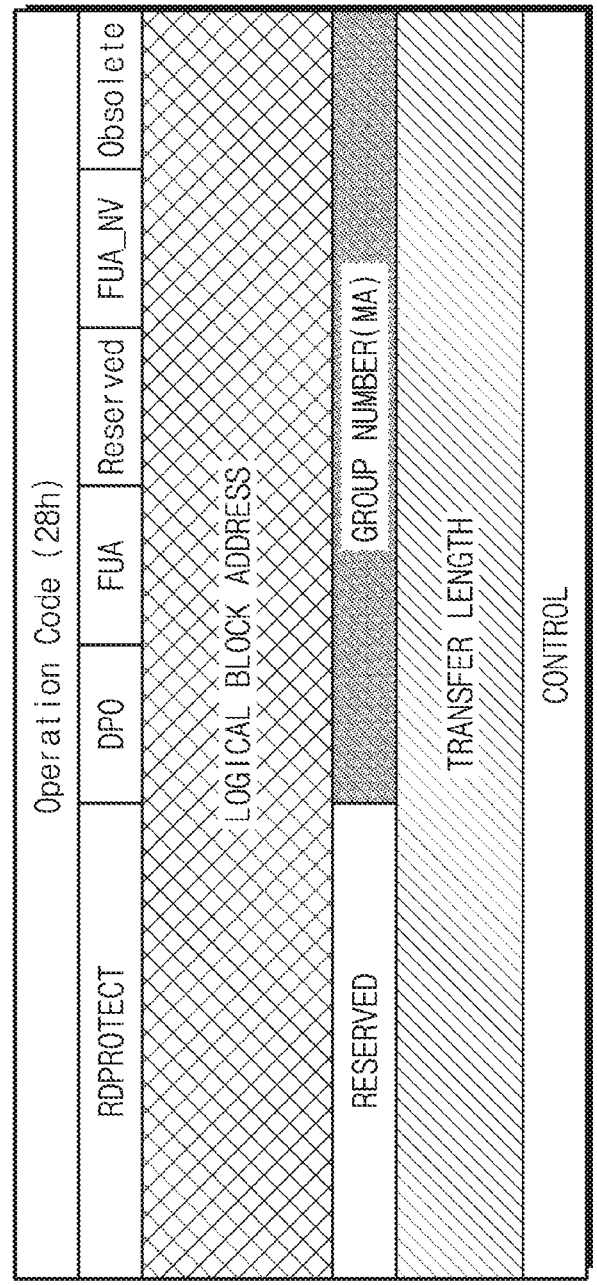
Figure 14C:
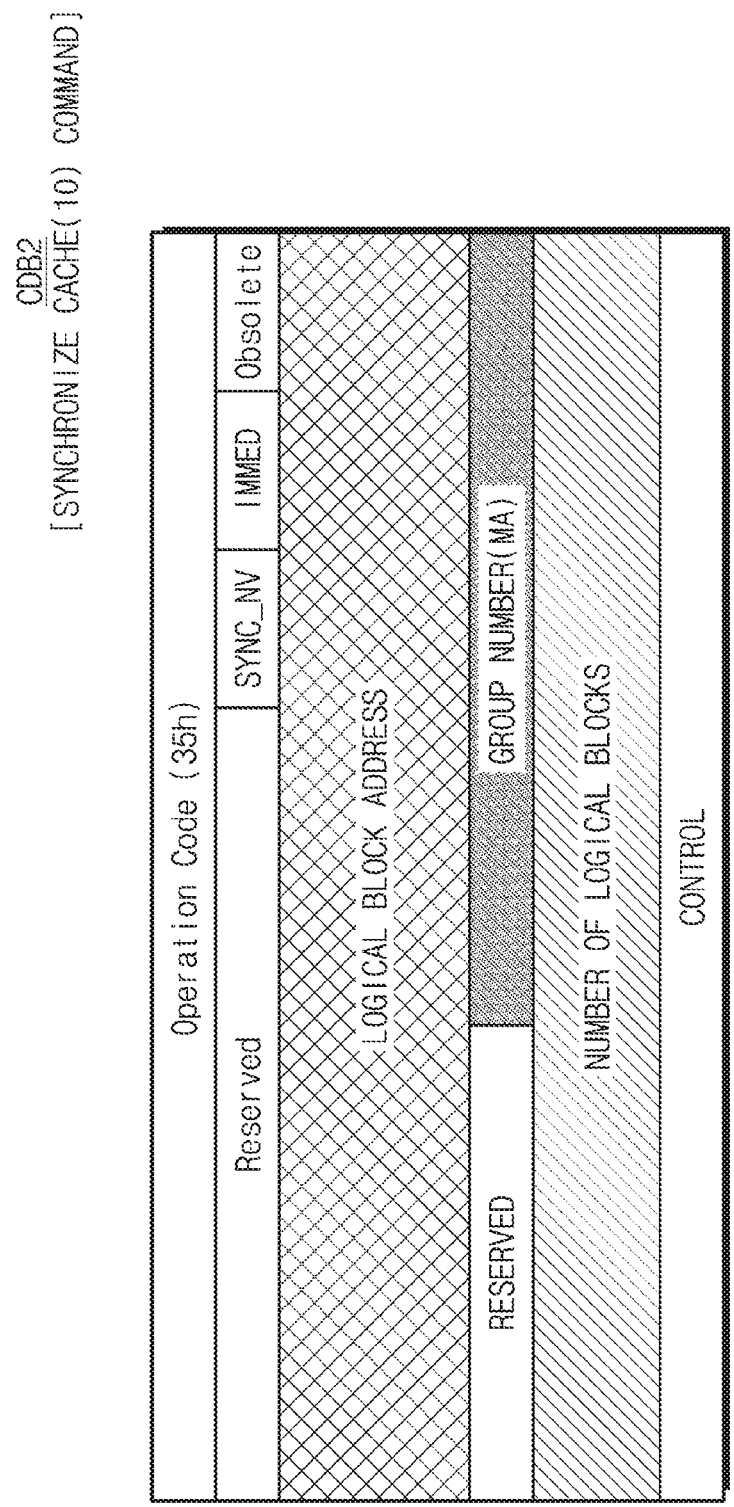
Figure 14D:
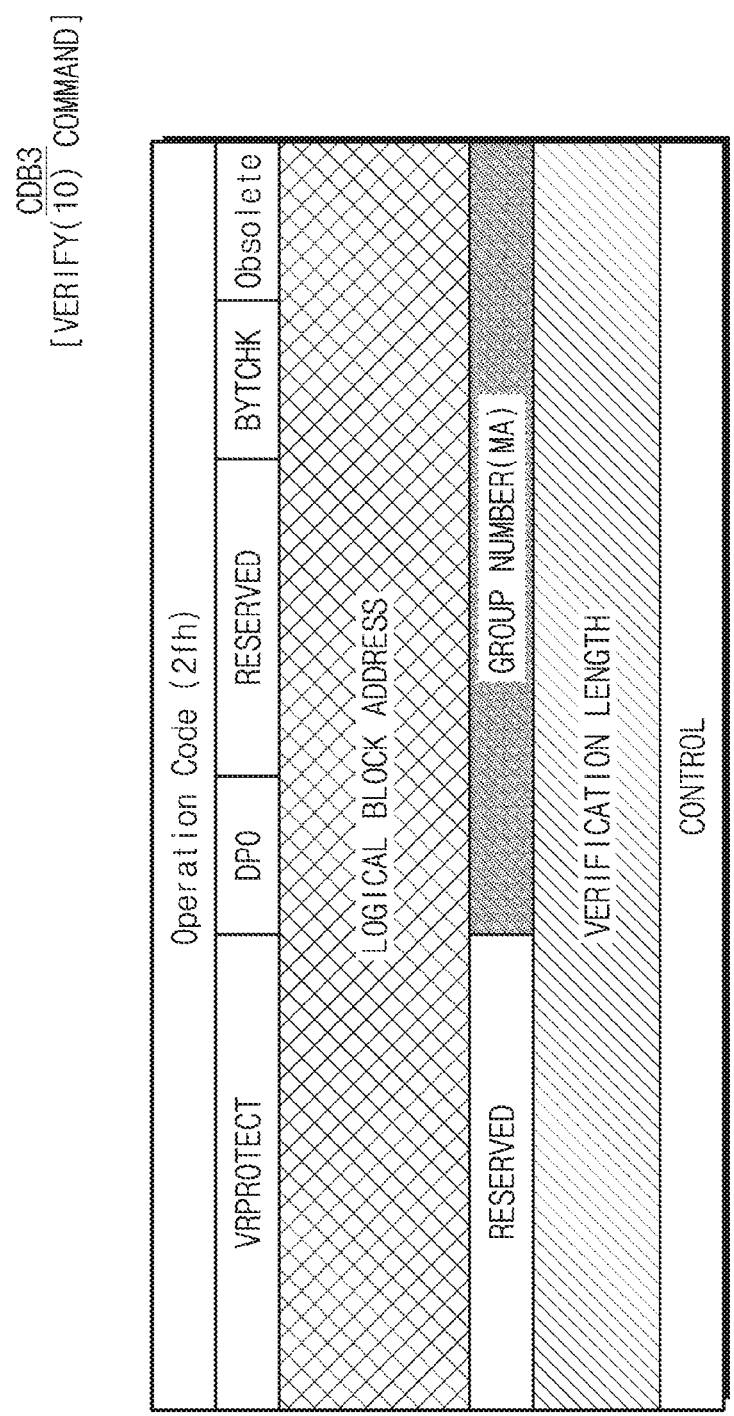

The first command descriptor block CDB1 of FIG. 14B is a format corresponding to a read command READ(10) COMMAND. The first command descriptor block CDB1 may include the following fields: Operation Code, RDPROTECT (Read Protection), Disable Page Out (DPO), Force Unit Access (FUA), Force Unit Access (FUA_NV), Obsolete, LOGICAL BLOCK ADDRESS, GROUP NUMBER, TRANSFER LENGTH, CONTROL, Reserved. A value of the "Operation Code" field of the first command descriptor block CDB1 being a read command may be "28h".

In an exemplary embodiment, the host 1100 sets the move attribute information MA in the "GROUP NUMBER" field of the first command descriptor block CDB1 corresponding to the read command. In an exemplary embodiment, the "GROUP NUMBER" field may include information about a context identifier Context ID for read data. An area (i.e., one of the pinned turbo write buffer TWB-p, the non-pinned turbo write buffer TWB-p, and the user storage UST) to which data is to moved may be determined based on the context identifier Context ID set in the "GROUP NUMBER" field. For example, data corresponding to a first context identifier may be moved to the pinned turbo write buffer TWB-p, data corresponding to a second context identifier may be moved to the non-pinned turbo write buffer TWB-np, and data corresponding to a third context identifier may be moved to the user storage UST. The context identifier may be determined depending on attributes of data or may be determined by various policies of the host 1100.

The storage device 1200 may determine an area to which data is to be moved, based on a value of the "GROUP NUMBER" field of the first command descriptor block CDB1, and may perform the move operation for data corresponding to a value of the "LOGICAL BLOCK ADDRESS" field to the determined area. That is, information about a logical block address corresponding to data to be moved may be set in the "LOGICAL BLOCK ADDRESS" field.

In an exemplary embodiment, a range of a logical block addresses corresponding to data to be moved may be determined based on values of the "LOGICAL ADDRESS" field and the "TRANSFER LENGTH" field of the first command descriptor block CDB1.

The second command descriptor block CDB2 of FIG. 14C is a format corresponding to a synchronize cache command SYNCHRONIZE CACHE(10) COMMAND. The second command descriptor block CDB2 may include the following fields: Operation Code, Synchronize (SYNC_NV), Immediate (IMMED), Obsolete, LOGICAL BLOCK ADDRESS, GROUP NUMBER, NUMBER OF LOGICAL BLOCKS, CONTROL, and Reserved. A value of the "Operation Code" field of the second command descriptor block CDB2 being the synchronize cache command may be "35h".

As in the above description, the host 1100 may set the move attribute information MA in the "GROUP NUMBER" field of the second command descriptor block CDB2. That is, information about a logical block address corresponding to data to be moved may be set in the "LOGICAL BLOCK ADDRESS" field. How to set the "GROUP NUMBER" field and the "LOGICAL BLOCK ADDRESS" field and how to move data based on the "GROUP NUMBER" and "LOGICAL BLOCK ADDRESS" fields are described above, and thus, additional description will be omitted to avoid redundancy.

In an exemplary embodiment, the synchronize cache command moves data (e.g., a block of data) whose latest version is held in a cache (e.g., a volatile memory) to the nonvolatile memory 1220 (e.g., to the user storage UST). For example, the storage device 1200 may additionally include the volatile memory. In an exemplary embodiment, when the synchronize cache command additionally includes the move attribute information MA, after the data is moved from the cache to the user storage UST, the data is moved from the user storage UST to one of the turbo write pinned turbo write buffer TWB-p and the non-pinned turbo write buffer TWB-np based on the move attribute information MA. In an alternate embodiment, when the synchronize cache command additionally includes the move attribute information MA, the move of the data from the cache to the user storage UST is skipped and the data from the cache is moved directly to the to one of the turbo write pinned turbo write buffer TWB-p and the non-pinned turbo write buffer TWB-np based on the move attribute information MA. The synchronize cache command may be used to guarantee that the data is in its latest state. For example, if the data was copied to the non-pinned turbo write buffer TWB-np and the user storage UST, and then the data was updated in the user storage UST, the synchronize cache command might cause the data in the non-pinned turbo write buffer TWB-np to be updated to match its state in the user storage UST.

The third command descriptor block CDB3 of FIG. 14D is a format corresponding to a verify command VERIFY(10) COMMAND. The third command descriptor block CDB3 may include the following fields: Operation Code, Verify Protection (VRPROTECT), Disable Page Out (DPO), Byte Check (BYTCHK), Obsolete, LOGICAL BLOCK ADDRESS, GROUP NUMBER, VERIFICATION LENGTH, CONTROL, Reserved. A value of the "Operation Code" field of the third command descriptor block CDB3 being the verify command may be "2fh".

As in the above description, the host 1100 may set the move attribute information MA in the "GROUP NUMBER" field of the third command descriptor block CDB3. That is, information about a logical block address corresponding to data to be moved may be set in the "LOGICAL BLOCK ADDRESS" field. How to set the "GROUP NUMBER" field and the "LOGICAL BLOCK ADDRESS" field and how to move data based on the "GROUP NUMBER" and "LOGICAL BLOCK ADDRESS" fields are described above, and thus, additional description will be omitted to avoid redundancy.

In an exemplary embodiment, the verify command is used to verify data within one or more blocks of the memory device 1200. For example, the verify command may perform checks for errors on the data and may correct the errors that are within its capability to correct. For example, the verify command could be applied to data in the user storage UST. In an exemplary embodiment, when the verify command additionally includes the move attribute information MA, after the data in the user storage UST is verified (e.g., error corrected), the data is moved from the user storage UST to one of the turbo write pinned turbo write buffer TWB-p and the non-pinned turbo write buffer TWB-np based on the move attribute information MA. In another example, the verify command may verify whether an area storing data associated with the logical block address is accessible. In an exemplary embodiment, when the verify command additionally includes the move attribute information MA and VERIFICATION LENGTH=0, the verify on the data stored in the user storage UST is skipped and the data is moved from the user storage UST to one of the turbo write pinned turbo write buffer TWB-p and the non-pinned turbo write buffer TWB-np based on the move attribute information MA.

As described above, the host 1100 of the storage system 1000 according to an exemplary embodiment of the inventive concept may set the move attribute information MA in a particular field (e.g., the "Flags" field of the CMD UPIU or the "GROUP NUMBER" field of the command descriptor block) of the CMD UPIU defined by the UFS interface or the command descriptor block CDB included in the CMD UPIU, and the storage device 1200 may receive the CMD UPIU including the move attribute information MA from the host 1100 and may move data to an area corresponding to the move attribute information MA in response to the received CMD UPIU. That is, there is support for a data move between various areas (e.g., the pinned turbo write buffer TWB-p, the non-pinned turbo write buffer TWB-np, and the user storage UST) in the storage device 1200 without use of an additional command. In an exemplary embodiment, in the case where move attribute information is included in the CMD UPIU or the command descriptor block CDB, an original operation corresponding to the CMD UPIU or the command descriptor block CDB may be omitted.

In an exemplary embodiment, to prevent a data transfer (a transfer of the DATA IN UPIU) from the storage device 1200 during the above-described data move operation, the host 1100 may set a particular value (e.g., "0") in a particular field (e.g., the "Expected Data Transfer Length" field of the CMD UPIU) of the CMD UPIU or in the command descriptor block CDB. In this case, even though a read command is received from the host 1100, the storage device 1200 only performs a move of the data and does not transfer the data (i.e., the DATA IN UPIU) to the host 1100.

In an exemplary embodiment, in an operation associated with the second and third command descriptor blocks CDB2 and CDB3 described with reference to FIGS. 14C and 14D, the data input/output may not be made between the host 1100 and the storage device 1200 (i.e., the DATA IN UPIU or the DATA OUT UPIU may not be transferred). That is, in the data move using the second and third command descriptor blocks CDB2 and CDB3 described with reference to FIGS. 14C and 14D, the data input/output may be omitted without setting a separate value in a particular field.

In an exemplary embodiment, in the read command, the synchronize cache command, and the verify command described with reference to FIGS. 14A to 14D, in the case where the move attribute information MA is not set (i.e., in the case where the move attribute information MA is not included), the storage device 1200 performs an operation corresponding to a received CMD UPIU. In this case, the data move is not performed. For example, in response to the read command in which the move attribute information MA is not included, the storage device 1200 performs a read operation corresponding to the read command. Alternatively, in response to the synchronize cache command in which the move attribute information MA is not included, the storage device 1200 performs a normal cache synchronization operation. The cache synchronization operation may indicate an operation that guarantees that a particular logical block address has the latest data stored in the storage device 1200. Alternatively, in response to the verify command in which the move attribute information MA is not included, the storage device 1200 performs a normal verification operation. The verification operation may indicate an operation of verifying whether particular logical blocks or a particular logical block range of the storage device 1200 is accessible.

Figure 15:
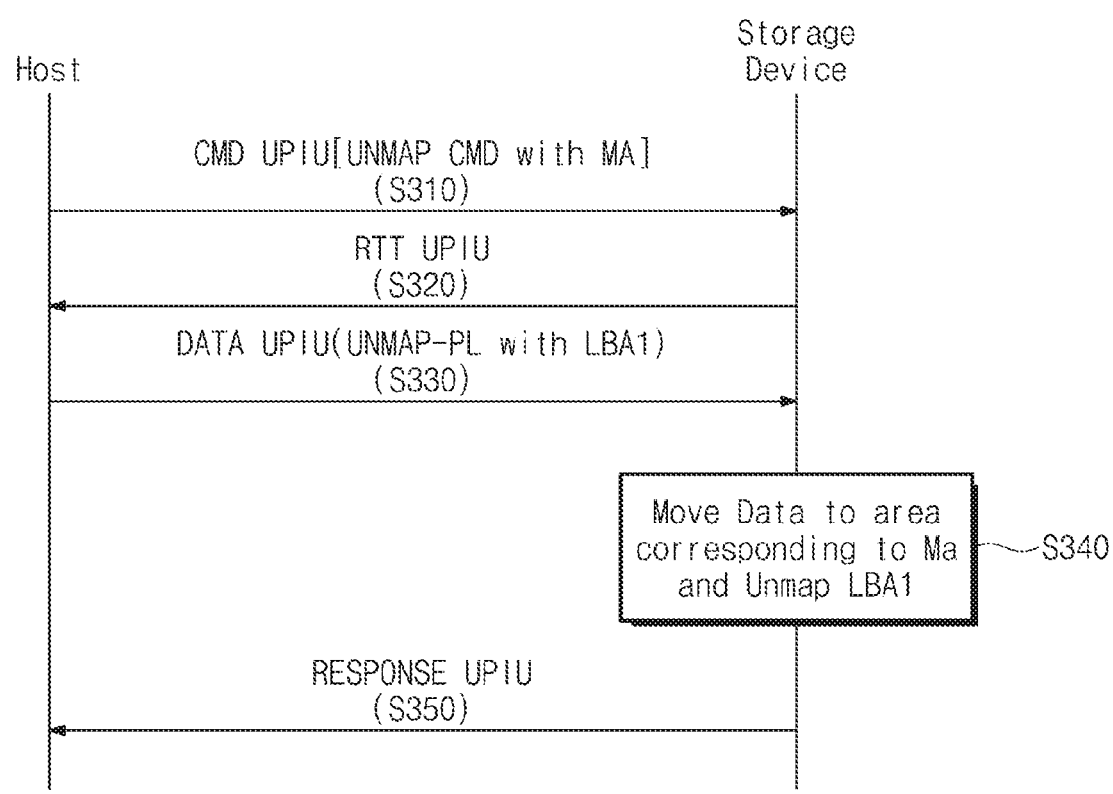
FIG. 15 is a flowchart illustrating an operation of a storage system of FIG. 1 according to an exemplary embodiment of the inventive concept.
Figure 16A:
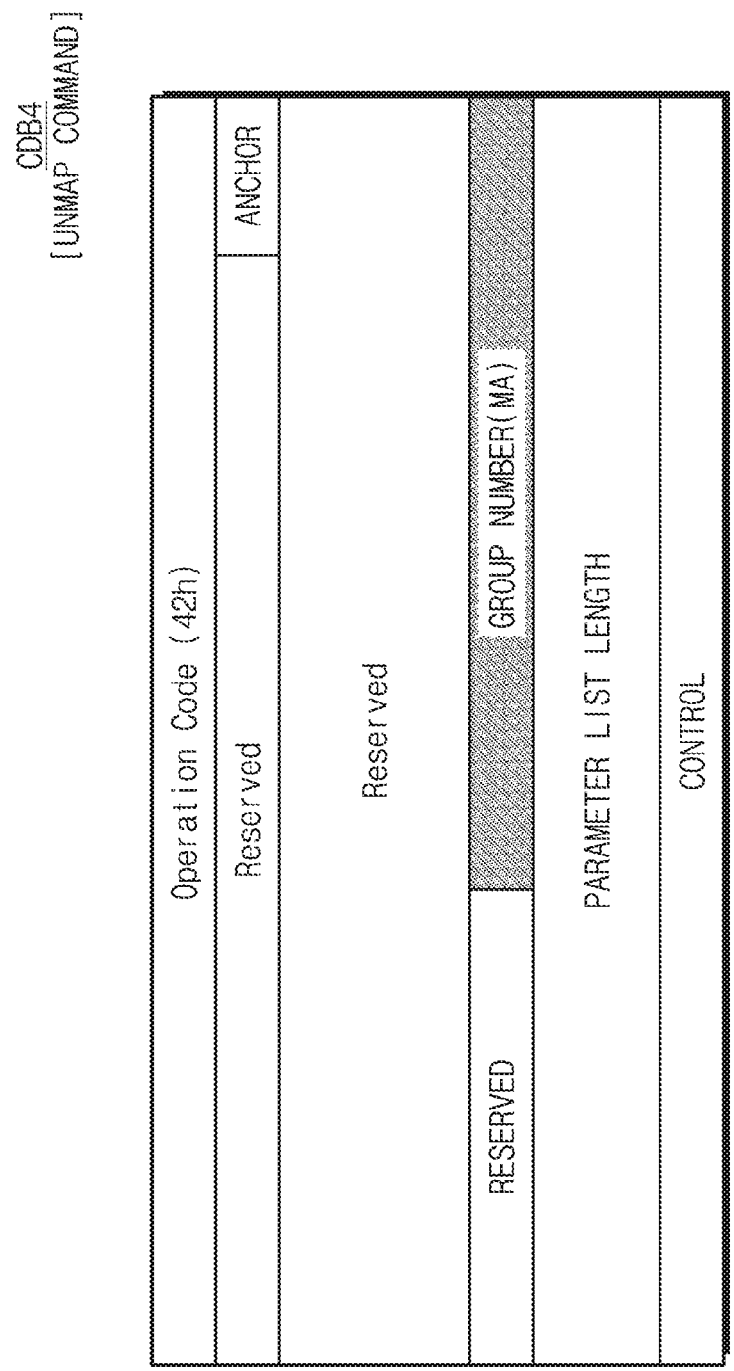
FIGS. 16A to 16C are diagrams for describing an operation according to the flowchart of FIG. 15.
Figure 16B:
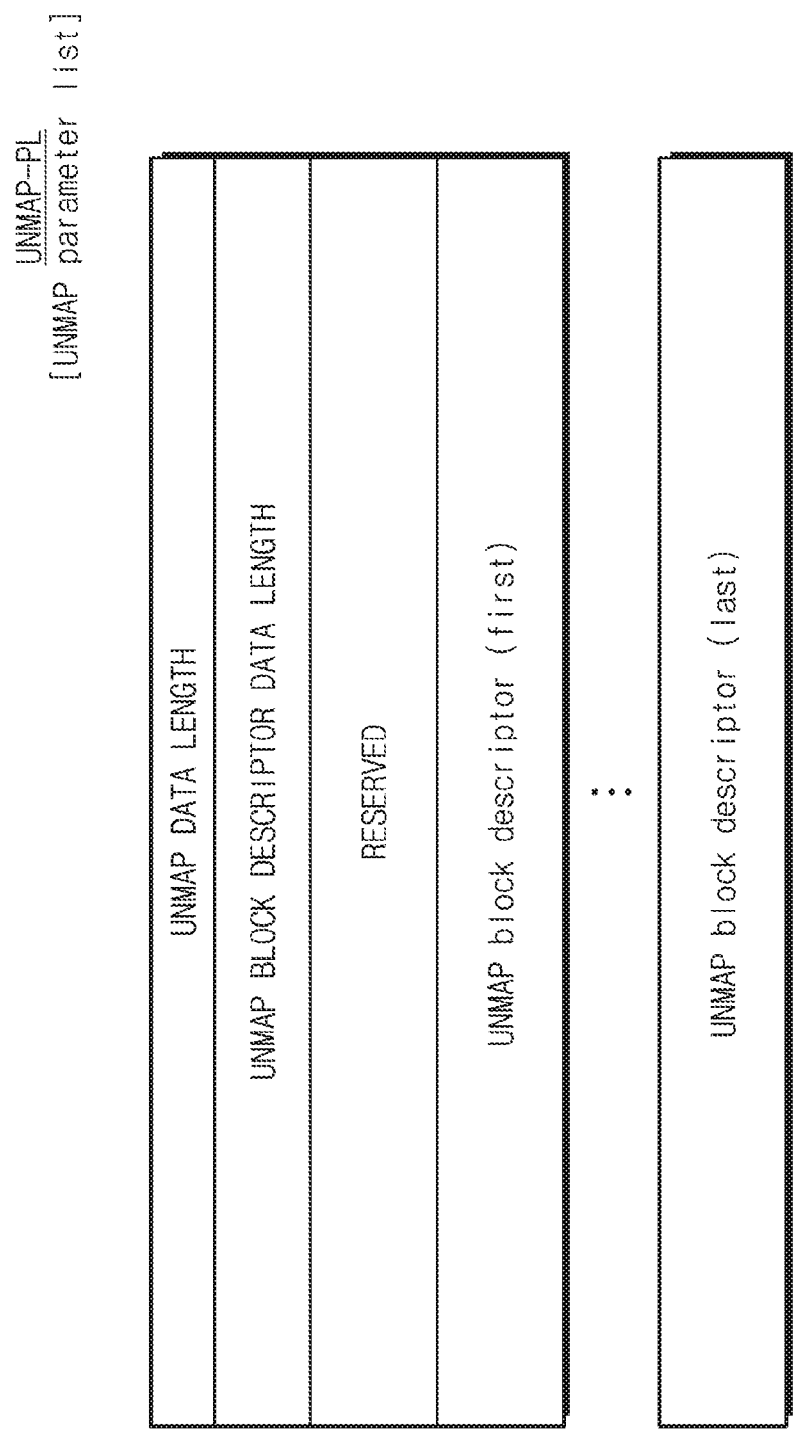
Figure 16C:
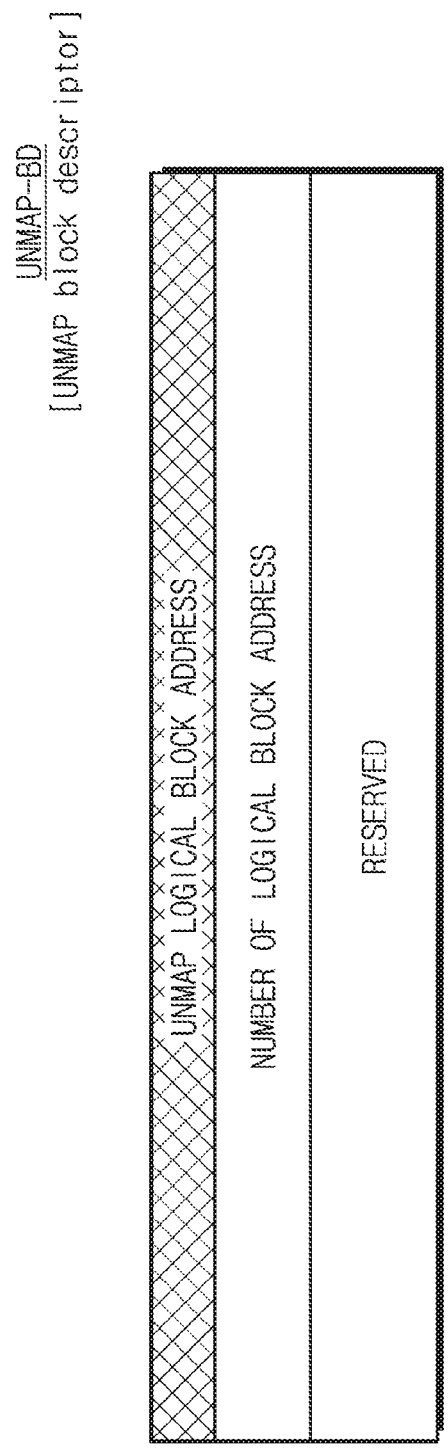

FIG. 15 is a flowchart illustrating an operation of a storage system of FIG. 1 according to an exemplary embodiment of the inventive concept. FIGS. 16A to 16C are diagrams for describing an operation according to the flowchart of FIG. 15. A scheme to move data by using an UNMAP COMMAND will be described with reference to FIGS. 15 to 16C.

Referring to FIGS. 1, 8, and 15 to 16C, in operation S310, the host 1100 transfers the CMD UPIU to the storage device 1200. In this case, the CMD UPIU includes the UNMAP COMMAND including the move attribute information MA. A fourth command descriptor block CDB4 illustrated in FIG. 16A is a format corresponding to the UNMAP COMMAND. The fourth command descriptor block CDB4 may include the following fields: Operation Code, ANGHOR, GROUP NUMBER, PARAMETER LIST LENGTH, CONTROL, and Reserved. A value of the "Operation Code" field of the fourth command descriptor block CDB4 being the UNMAP COMMAND may be "42h".

As in the above description, the host 1100 may set the move attribute information MA in the "GROUP NUMBER" field of the fourth command descriptor block CDB4. How to set the "GROUP NUMBER" field and how to move data based on the "GROUP NUMBER" field are described above, and thus, additional description will be omitted to avoid redundancy.

In operation S320, the storage device 1200 transfers the RTT UPIU to the host 1100. For example, the RTT UPIU is transferred to the host 1100 in response to the storage device 1200 receiving the CMD UPIU or the UNMAP COMMAND. For example, the RTT UPIU may inform the host 1100 that the storage device 1200 has received the CMD UPIU or the UNMAP COMMAND.

In operation S330, the host 1100 transfers the DATA OUT UPIU to the storage device 1200 in response to the RTT UPIU. In this case, the DATA OUT UPIU includes an unmap parameter list UNMAP-PL including a first logical block address LBA1. For example, a data format of FIG. 16B illustrates an exemplary structure of the unmap parameter list UNMAP-PL. The unmap parameter list UNMAP-PL may include an "UNMAP DATA LENGTH" field, an "UNMAP BLOCK DESCRIPTOR DATA LENGTH" filed, a "Reserved" field, and a plurality of UNMAP block descriptors.

As illustrated in FIG. 16C, each of the plurality of UNMAP block descriptors may include an "UNMAP LOGICAL BLOCK ADDRESS" field, a "NUMBER OF LOGICAL BLOCK ADDRESS" field, and a "Reserved" field. A logical block address (e.g., the first logical block address LBA1) corresponding to data to be moved may be set in the "UNMAP LOGICAL BLOCK ADDRESS" field.

That is, as illustrated in FIGS. 16B and 16C, the DATA OUT UPIU provided from the host 1100 in operation S330 may include the unmap parameter list UNMAP-PL including information about the first logical block address LBA1.

In operation S340, in response to the received CMD UPIU and the received DATA OUT UPIU, the storage device 1200 moves data corresponding to the first logical block address LBA1 to an area corresponding to the move attribute information MA and performs an unmap operation on the first logical block address LBA1. In this case, the unmap operation associated with the first logical block address LBA1 may mean an operation of removing the mapping between a physical address and the first logical block address LBA1 before data is moved.

For example, it is assumed that the move attribute information MA corresponding to the pinned turbo write buffer TWB-p is received in a state where the data corresponding to the first logical block address LBA1 is present in the user storage UST. In this case, the storage device 1200 moves the data corresponding to the first logical block address LBA1 from the user storage UST to the pinned turbo write buffer TWB-p. Afterwards, the storage device 1200 releases (i.e., unmaps) the mapping relationship between the first logical block address LBA1 and the physical address of the user storage UST. In this case, the first logical block address LBA1 maintains the mapping relationship with a physical address of the pinned turbo write buffer TWB-p. For example, the release of the mapping information may be performed by deleting an entry of a mapping table associated with the user storage UST that maps logical block addresses to physical addresses of the user storage UST. In an exemplary embodiment, the releasing or unmapping is skipped or omitted when the PARAMETER LIST LENGTH is set to a certain value (e.g., 0).

Afterwards, in operation S350, the storage device 1200 transfers the RESPONSE UPIU to the host 1100. In an example embodiment, the host 1100 may recognize that the data move has completed, in response to the RESPONSE UPIU. For example, the RESPONSE UPIU could indicate that the unmap and/or the data move completed.

According to the above embodiments of the inventive concept, while the host 1100 and the storage device 1200 communicating based on the UFS interface sets the move attribute information MA in a particular field (e.g., at the "Flags" field of the CMD UPIU or the "GROUP NUMBER" of the command descriptor block CDB) of the CMD UPIU or the command descriptor block CDB without a separate definition of an additional command, the storage device 1200 may perform a data move between various areas. When the host 1100 sets a value of a particular field (e.g., the "Expected Data Transfer Length" field of the CMD UPIU) of the CMD UPIU or the command descriptor block CDB without a separate definition of an additional command to a particular value (e.g., "0"), only the data move may be performed without a data transfer (e.g., a transfer of the DATA IN UPIU) from the storage device 1200. Accordingly, a data move between various areas in a storage device may be supported without an increase in the complexity of the UFS interface.

In the above embodiments, a description is given with the physical storage space PS of the storage device 1200 being divided into the pinned turbo write buffer TWB-p, the non-pinned turbo write buffer TWB-np, and the user storage UST, but the inventive concept is not limited thereto. For example, the physical storage space PS of the storage device 1200 may include a plurality of turbo write buffers TWB and the user storage UST. The plurality of turbo write buffers TWB may have different characteristics depending on a reliability, an operating speed, a lifetime, etc. Each of the plurality of turbo write buffers TWB may include a pinned turbo write buffer and a non-pinned turbo write buffer. In this case, the host 1100 and the storage system 1000 of the storage system 1000 according to an embodiment of the inventive concept may support or perform the data move between various areas included in the physical storage space PS of the storage device 1200 by using a scheme similar to the above scheme.

Figure 17:
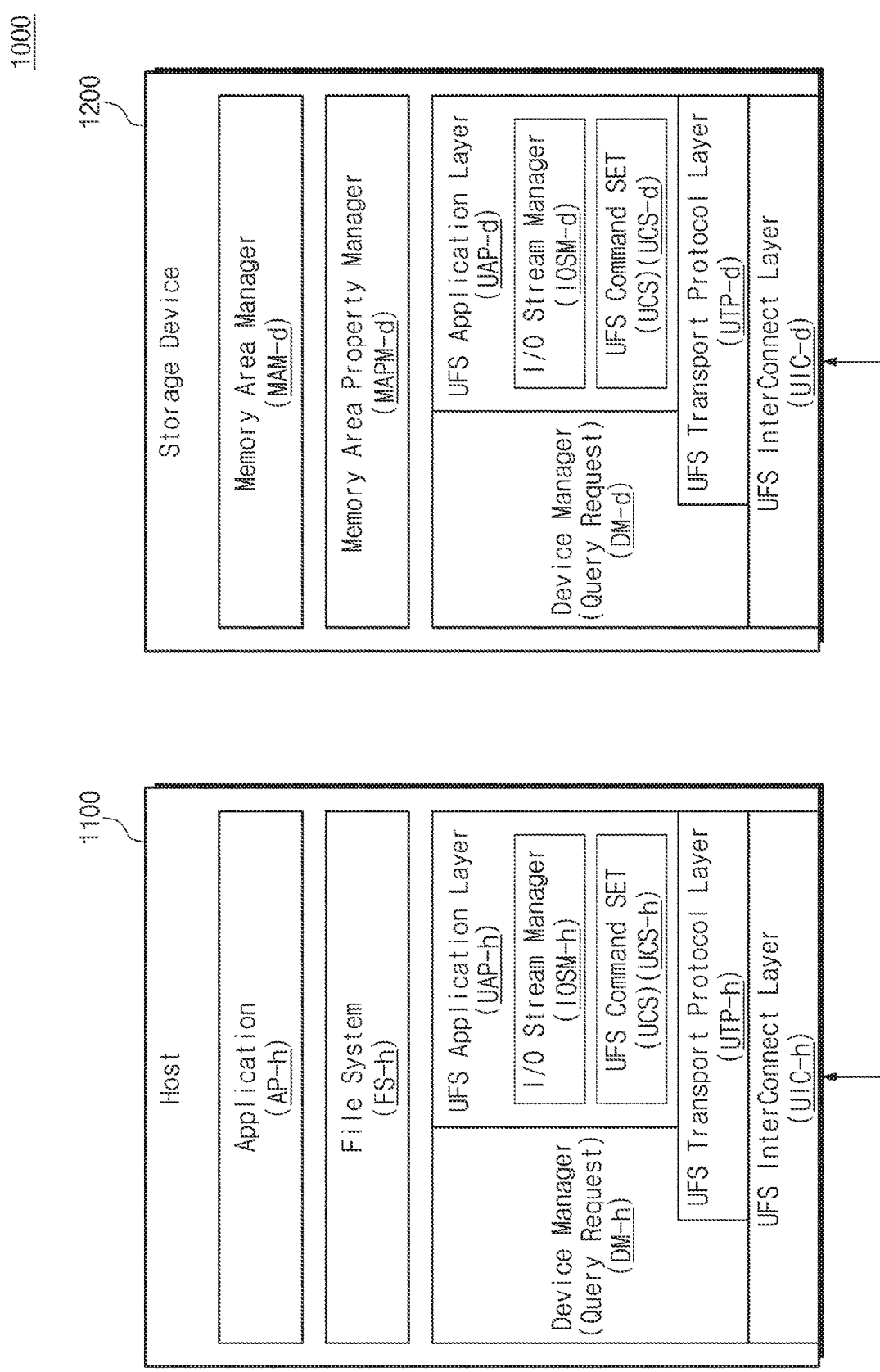
FIG. 17 is a diagram illustrating a hierarchical structure of a storage system of FIG. 1.

FIG. 17 is a diagram illustrating a hierarchical structure of the storage system 1000 of FIG. 1. Referring to FIG. 17, the storage system 1000 may include the host 1100 and the storage device 1200. The host 1100 may include an application AP-h, a file system FS-h, a device manager DM-h, a UFS application layer UAP-h, a UFS transport protocol layer UTP-h, and a UFS interconnect layer UIC-h.

The application AP-h may include various application programs, processes, etc. that are driven at the host 1100. The file system FS-h may be configured to organize and manage a variety of data generated by the application AP-h. In an exemplary embodiment of the inventive concept, the application AP-h or the file system FS-h may be configured to determine a logical block address range to specify a logical block address range for a particular area, as described with reference to FIGS. 15 to 19. Information about the determined logical block address range may be provided to a lower layer (e.g., the device manager DM-h or the UFS application layer UAP-h).

The UFS application layer UAP-h is configured to support various commands between the host 1100 and the storage device 1200. For example, the UFS application layer UAP-h may include an input/output (I/O) stream manager IOSM-h and a UFS command set UCS-h. The I/O stream manager IOSM-h is configured to manage a request from the application AP-h or the file system FS-h.

In an exemplary embodiment of the inventive concept, the I/O stream manager IOSM-h may be configured to identify a particular value of an input/output from the application AP-h or the file system FS-h. The I/O stream manager IOSM-h may be configured to manage a priority of a request from the application AP-h or the file system FS-h or to support various functions according to the request from the application AP-h or the file system FS-h. In an exemplary embodiment of the inventive concept, the I/O stream manager IOSM-h may be configured to support the turbo write function or the turbo read function.

In an exemplary embodiment of the inventive concept, a particular application or process specified by the host 1100 or a user of the host 1100 may use the turbo write or the turbo read. The I/O stream manager IOSM-h may determine whether to perform the turbo write or the turbo read in response to a write or read request that is made by the particular application or process with regard to the storage device 1200.

In addition, particular data that are managed by the file system FS-h may use the turbo write or the turbo read. The I/O stream manager IOSM-h may determine whether to perform the turbo write or the turbo read in response to the write or read request for the storage device 1200 with regard to particular data (e.g., meta data).

In addition, the I/O stream manager IOSM-h may direct a move of data written in the storage device 1200. The I/O stream manager IOSM-h may adjust a read speed of data written in the storage device 1200 by moving data to the pinned turbo write buffer TWB-p, the non-pinned turbo write buffer TWB-np, or the user storage UST.

In an exemplary embodiment of the inventive concept, as described with reference to above drawings, the I/O stream manager IOSM-h may determine an area (e.g., the pinned turbo write buffer TWB-p, the non-pinned turbo write buffer TWB-np, or the user storage UST) in which particular data are to be stored depending on attributes of the particular data and may provide information about the determination (e.g., the area information ARI) to the UFS command set UCS-h.

In an exemplary embodiment of the inventive concept, as described with reference to above drawings, the I/O stream manager IOSM-h may determine a logical block address, at which the particular data are to be stored, based on the attributes of the particular data and a predetermined logical block address range and may provide information about the determined logical block address range to the UFS command set UCS-h.

The UFS command set UCS-h may support various command sets that are supported between the host 1100 and the storage device 1200. In an exemplary embodiment of the inventive concept, the UFS command set UCS-h may include a UFS native command set and a UFS SCSI command set. The UFS command set UCS-h may configure a command to be transferred to the storage device 1200 depending on a request from the application AP-h or the file system FS-h.

In an exemplary embodiment of the inventive concept, the UFS command set UCS-h may be configured to receive various information (e.g., a logical block address, area information, a logical block address range, or range area information) from the I/O stream manager IOSM-h and to generate various commands depending on the methods described with reference to above drawings.

The UFS application layer UAP-h may further include a task manager that processes commands for a control of a command queue.

The device manager DM-h may manage operations of a device level and configurations of a device level. In an exemplary embodiment of the inventive concept, the device manager DM-h may manage a query request for setting or checking various information of the storage device 1200.

The UFS transport protocol layer UTP-h may provide services for an upper layer. The UFS transport protocol layer UTP-h may generate a command or information provided from the UFS application layer UAP-h, or a query request provided from the device manager DM-h in the form of a UPIU (UFS Protocol Information Unit) packet.

In an exemplary embodiment of the inventive concept, the UFS transport protocol layer UTP-h and the device manager DM-h may communicate with each other through a UDM-SAP (UDM-Service Access Point). The UFS transport protocol layer UTP-h and the UFS application layer UAP-h may communicate with each other through a UTP_CMD_SAP or a UTP_TM_SAP.

The UFS interconnect layer UIC-h may manage a connection with the storage device 1200. In an exemplary embodiment of the inventive concept, the UFS interconnect layer UIC-h may include hardware configurations such as an MIPI Unipro or an MIPI M-PHY physically connected with the UFS interconnect layer UIC-d of the storage device 1200. This way the host 1100 and storage device 1200 can establish a communication channel with each other. In an exemplary embodiment of the inventive concept, the UFS interconnect layer UIC-h and the UFS transport protocol layer UTP-h may communicate through a UIC-SAP, and the UFS interconnect layer UIC-h and the device manager DM-h may communicate through a UIO-SAP.

The storage device 1200 may include a memory area manager MAM-d, a memory area property manager MAPM-d, a device manager DM-d, a UFS application layer UAP-d, a UFS transport protocol layer UTP-d, and a UFS interconnect layer UIC-d. In an exemplary embodiment of the inventive concept, a configuration of the UFS application layer UAP-d, the UFS transport protocol layer UTP-d, and the UFS interconnect layer UIC-d may be similar to that of the UFS application layer UAP-h, the UFS transport protocol layer UTP-h, and the UFS interconnect layer UIC-h of the host 1100 and allows corresponding layers to logically communicate with each other, and thus, additional description will be omitted to avoid redundancy.

The memory area property manager MAPM-d of the storage device 1200 may specify and manage an area where write data received from the host 1100 are to be stored. For example, as described above, depending on the explicit request of the host 1100 or the internal policy, the write data received from the host 1100 may be written in a space of at least one of the pinned turbo write buffer TWB-p, the non-pinned turbo write buffer TWB-np, and the user storage UST. The memory area property manager MAPM-d may select a space, in which the write data received from the host 1100 are to be stored, based on the various schemes described above and may store the write data in the selected space.

As described above, depending on the explicit request of the host 1100 or the internal policy, the memory area manager MAM-d of the storage device 1200 may control data move/flush/migration between the pinned turbo write buffer TWB-p, the non-pinned turbo write buffer TWB-np, and the user storage UST.

The above hierarchical structure and function of each of the host 1100 and the storage device 1200 is merely exemplary, and the inventive concept is not limited thereto.

Figure 18:
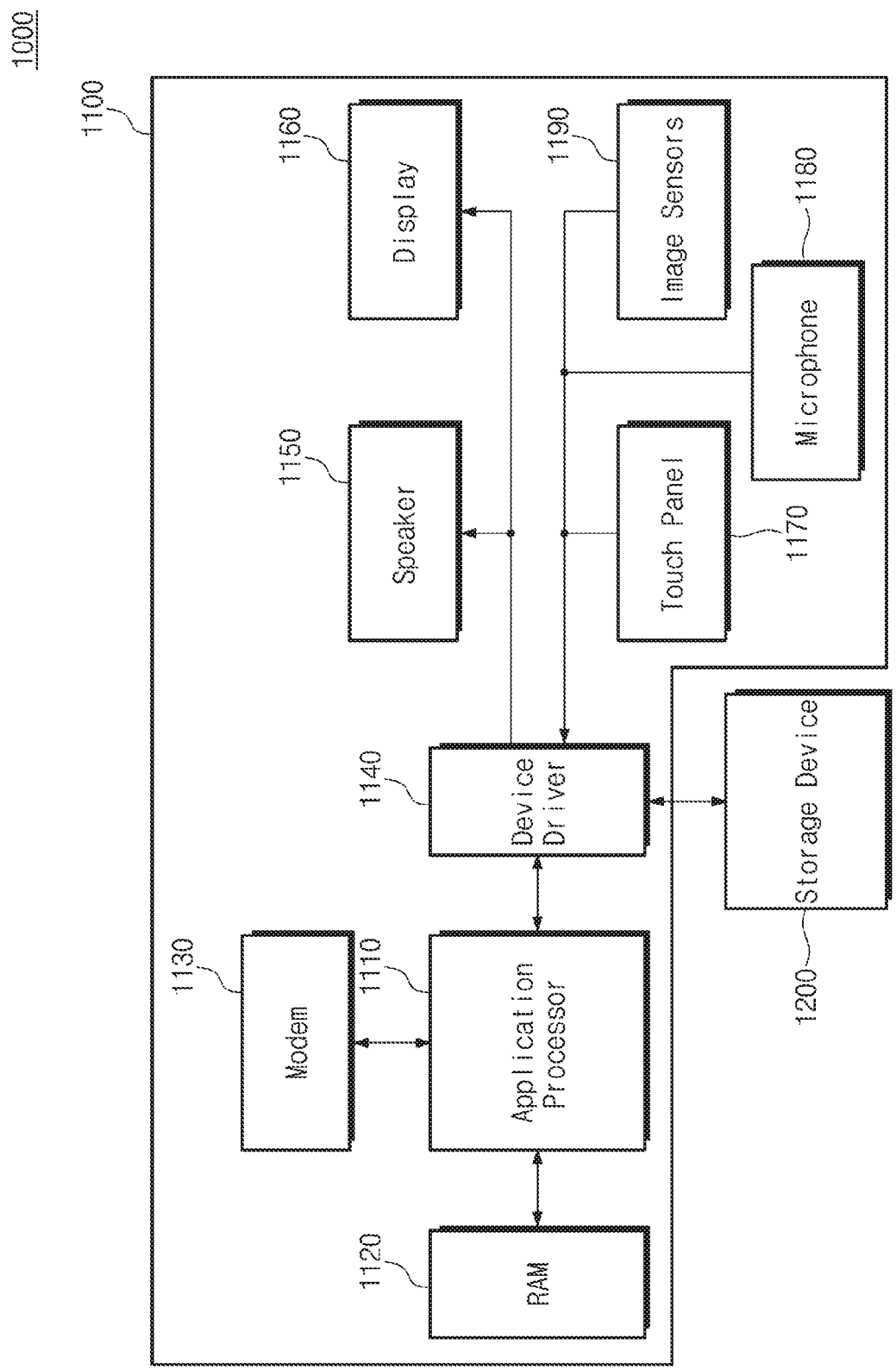
FIG. 18 is a block diagram illustrating a storage system according to an exemplary embodiment of the inventive concept in detail.

FIG. 18 is a block diagram illustrating the storage system 1000 according to an exemplary embodiment of the inventive concept in detail. Referring to FIGS. 17 and 18, the storage system 1000 may include the host 1100 and the storage device 1200. The host 1100 and the storage device 1200 may operate as described with reference to above drawings.

The host 1100 may include an application processor 1110, a random access memory (RAM) 1120, a modem 1130, a device driver 1140, a speaker 1150, a display 1160, a touch panel 1170, a microphone 1180, and image sensors 1190.

The application processor 1110 may execute the application AP-h and the file system FS-h. The application processor 1110 may use the RAM 1120 as a system memory. The application processor 1110 may communicate with an external device through the modem 1130 in a wired fashion or wirelessly. For example, the modem 1130 may be embedded in the application processor 1110.

The application processor 1110 may communicate with peripheral devices through the device driver 1140. For example, the application processor 1110 may communicate with the speaker 1150, the display 1160, the touch panel 1170, the microphone 1180, the image sensors 1190, and the storage device 1200 through the device driver 1140.

The device driver 1140 may include the device manager DM-h, the UFS application layer UAP-h, the UFS transport protocol layer UTP-h, and the UFS interconnect layer UIC-h. For example, the device driver 1140 may be embedded in the application processor 1110.

The speaker 1150 and the display 1160 may be user output interfaces that transfer information to the user. The touch panel 1170, the microphone 1180, and the image sensors 1190 may be user input interfaces that receive information from the user.

In an exemplary embodiment of the inventive concept, the storage device 1200 may be used as a high-capacity storage medium of the host 1100. The storage device 1200 may be an embedded type of UFS device or a memory card type of UFS device. The UFS device of the memory card type may be inserted into or detached from an UFS slot included in the host 1100.

Figure 19:
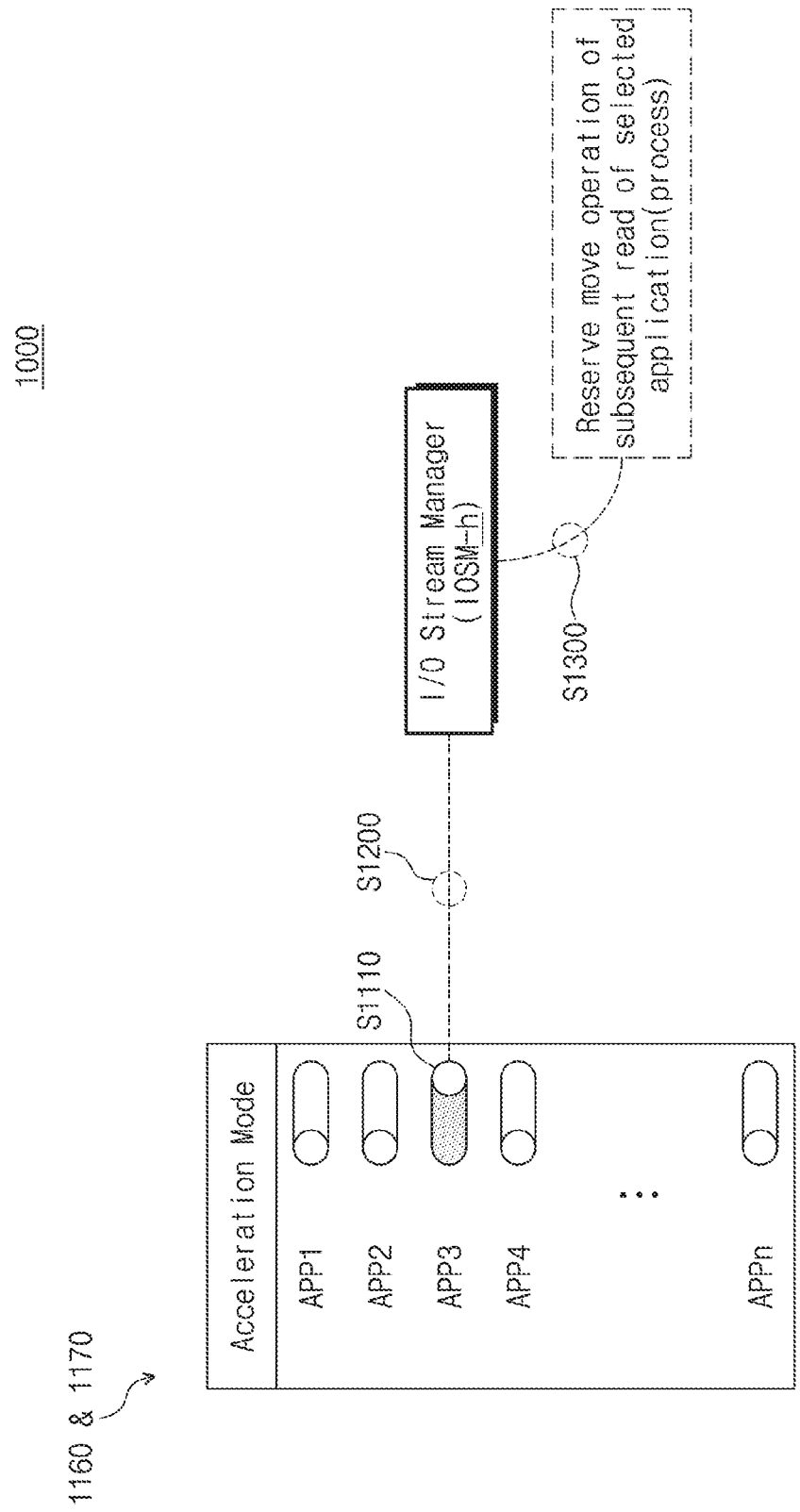
FIG. 19 illustrates a conceptual diagram in which an embodiment of the inventive concept is applied to a storage system.

FIG. 19 illustrates a diagram in which an exemplary embodiment of the inventive concept is applied to the storage system 1000. Referring to FIGS. 18 and 19, the storage system 1000 may provide setting screens through the display 1160. One of the setting screens may provide information of an acceleration mode to the user.

The storage system 1000 may display a list of first to n-th applications APP1 to APPn, to which the acceleration modes are applicable, through the display 1160. In addition, the storage system 1000 may display, through the display 1160, switches that allow the user to adjust the acceleration modes of the first to n-th applications APP1 to APPn.

In operation S1100, the user may touch an enable location of the acceleration mode of the third application APP3. The storage system 1000 may sense a touch of the user, in other words, the directions activating the third application APP3 through the touch panel 1170. In operation S1200, information of the third application APP3 or processes of the third application APP3 may be transferred to the I/O stream manager IOSM-h.

As the information of the third application APP3 or the processes of the third application APP3 are received, in operation S1300, the I/O stream manager IOSM-h may reserve a move operation of a subsequent read of the third application APP3 or the processes thus selected. For example, the I/O stream manager IOSM-h may set the move attributes MA with respect to data associated with the third application APP3 through the query request UPIU and may include a move flag as the move information MV in the CMD UPIU when a read operation associated with the third application APP3 is required.

As another example, the I/O stream manager IOSM-h may include a move flag and the move attributes MA as the move information MV in the CMD UPIU when a read operation associated with the third application APP3 is required. For example, the I/O stream manager IOSM-h may specify the pinned turbo write buffer TWB-p or the non-pinned turbo write buffer TWB-np as the destination information DST of the move attributes MA.

When the data associated with the third application APP3 are moved to the pinned turbo write buffer TWB-p or the non-pinned turbo write buffer TWB-np, an operation of reading the data associated with the third application APP3 is accelerated. Accordingly, the performance of the third application APP3 may be accelerated.

According to at least one exemplary embodiment of the inventive concept, a data move between various areas in a storage device may be supported without definition of additional commands between a host and the storage device communicating based on a UFS interface. Accordingly, a simple interface may be implemented between the host and the storage device.

Also, according to at least one exemplary embodiment of the inventive concept, the storage device may include a pinned turbo write buffer supporting a high-speed operation. Because it is possible to guarantee an operation of reading data from the pinned turbo write buffer at a high speed, the performance of the storage device may be improved. Accordingly, a storage device having reduced costs and improved performance may be provided.

While the inventive concept has been described with reference to exemplary embodiments thereof, it will be apparent to those of ordinary skill in the art that various changes and modifications may be made thereto without departing from the spirit and scope of the inventive concept.

What is claimed is:

1. A storage device comprising:
a nonvolatile memory device including a first region, a second region, and a third region; and
a controller configured to receive a first operation command including move attribute information and a first logical block address from an external host device and to move first data corresponding to the first logical block address to a region, which corresponds to the move information, from among the first region, the second region, and the third region in response to the received first operation command,
wherein, when the first operation command does not include the move attribute information, the controller performs a first operation corresponding to the first operation command,
wherein each of memory cells included in the first region and the second region is configured to store n-bit data, and each of memory cells included in the third region is configured to store m-bit data, where n and m are natural numbers and m is greater than n, and
wherein the controller is further configured to:
receive second data and a write command including a second logical block address from the external host device;
preferentially write the second data in the first region or the second region rather than the third region, when a turbo write function is enabled; and
write the second data in the first region, the second region or the third region depending on a normal write policy, when the turbo write function is disabled.

2. The storage device of claim 1, wherein the controller is further configured to:
receive a read command including the first logical block address from the external host device;
read the first data from a region, in which the first data is stored before the first data is moved, from among the first region, the second region, and the third region, when the move of the first data has not completed; and
read the first data from the region, which corresponds to the move information, from among the first region, the second region and transfer the read first data to the external host device, when the move has completed.

3. The storage device of claim 1, wherein the controller receives a query request universal flash storage protocol information unit (UPIU) from the external host device and enables or disables the turbo write function by setting a turbo write enable field of a flag stored within the controller in response to the query request UPIU.

4. The storage device of claim 1, wherein the controller is further configured to:
receive a query request universal flash storage protocol information unit (UPIU) from the external host device;
enable a turbo write buffer flush enable field of a flag stored within the controller in response to the received query request UPIU; and flush data stored in the second region to the third region in response to the turbo write buffer flush enable field being enabled.

5. The storage device of claim 1, wherein the move attribute information includes information a target region to which the first data is to be moved, from among the first region, the second region, and the third region.

6. The storage device of claim 5, wherein the first operation command is a command universal flash storage protocol information unit (UPIU) including an unmap command descriptor block,
wherein, in response to the command UPIU, the controller transfers a ready to transfer UPIU (RTT UPIU) to the external host device and receives an unmap parameter list including the first logical block address from the external host device through a DATA OUT UPIU,
wherein, when the move attribute information is not included in the command UPIU, the controller performs an unmap operation on the first logical block address, and
wherein, when the move attribute information is included in a Flags field of the command UPIU or a GROUP NUMBER field of the unmap command descriptor block, the controller skips the unmap operation and moves the first data to the target region.

7. The storage device of claim 5, wherein the first operation command is a command universal flash storage protocol information unit (UPIU) including a read command descriptor block, and
wherein the read command descriptor block includes a LOGICAL BLOCK ADDRESS field including information about the first logical block address.

8. The storage device of claim 7, wherein the command UPIU being the first operation command includes a Flags field, a GROUP NUMBER field, and an Expected Data Transfer Length field,
wherein the controller skips an operation of transferring the first data to the external host device when the Expected Data Transfer Length field is set to a certain value, and
wherein the move attribute information is included the Flags field or the GROUP NUMBER field.

9. The storage device of claim 5, wherein the first operation command is a command universal flash storage protocol information unit (UPIU) including a synchronize cache command descriptor block,
wherein the synchronize cache command descriptor block includes a LOGICAL BLOCK ADDRESS field, and
wherein the LOGICAL BLOCK ADDRESS field includes information about the first logical block address.

10. The storage device of claim 9, wherein the command UPIU being the first operation command includes a Flags field,
wherein the synchronize cache command descriptor block includes a GROUP NUMBER field,
wherein the move attribute information is included the Flags field or the GROUP NUMBER field, and
wherein, when the move attribute information is not included in the command UPIU being the first operation command, the controller performs the first operation of guaranteeing that the first data corresponding to the first logical block address is in its latest state.

11. The storage device of claim 5, wherein
the first operation command is a command universal flash storage protocol information unit (UPIU) including a verify command descriptor block,
wherein the verify command descriptor block includes a LOGICAL BLOCK ADDRESS field, and
wherein the LOGICAL BLOCK ADDRESS field includes information about the first logical block address.

12. The storage device of claim 11, wherein the command UPIU being the first operation command includes a Flags field,
wherein the verify command descriptor block includes a GROUP NUMBER field,
wherein the move attribute information is included the Flags field or the GROUP NUMBER field, and
wherein, when the move attribute information is not included in the command UPIU being the first operation command, the controller performs the first operation of verifying whether an region storing the first data corresponding to the first logical block address is accessible.

* * * * *